(12) United States Patent
Ruzanski et al.

(10) Patent No.: US 11,474,199 B2
(45) Date of Patent: Oct. 18, 2022

(54) RFI MITIGATION IN WEATHER RADAR DATA

(71) Applicant: Vaisala, Inc., Louisville, CO (US)

(72) Inventors: Evan Ruzanski, Boulder, CO (US);
Andrew Hastings Black, Medford, MA (US)

(73) Assignee: Vaisala, Inc., Louisville, CO (US)

( * ) Notice: Subject to any disclaimer, the term of this patent is extended or adjusted under 35 U.S.C. 154(b) by 14 days.

(21) Appl. No.: 17/011,856

(22) Filed: Sep. 3, 2020

(65) Prior Publication Data
US 2022/0065983 A1 Mar. 3, 2022

(51) Int. Cl.
*G01S 7/02* (2006.01)
*G01S 13/95* (2006.01)

(52) U.S. Cl.
CPC ............ *G01S 7/023* (2013.01); *G01S 13/951* (2013.01)

(58) Field of Classification Search
None
See application file for complete search history.

(56) References Cited

U.S. PATENT DOCUMENTS

| | | | |
|---|---|---|---|
| 5,473,332 A | 12/1995 | James | |
| 6,035,057 A * | 3/2000 | Hoffman | G06K 9/6251 382/156 |
| 6,340,946 B1 * | 1/2002 | Wolfson | G01S 13/953 342/195 |
| 6,608,586 B1 | 8/2003 | Doerry | |
| 9,411,072 B1 * | 8/2016 | Dixon | G01W 1/00 |

(Continued)

FOREIGN PATENT DOCUMENTS

| | | | |
|---|---|---|---|
| CN | 106597443 B | * | 2/2019 |
| CN | 110596787 A | | 12/2019 |
| EP | 1672379 B1 | | 8/2012 |

OTHER PUBLICATIONS

Cho, John Y. N. "A New Radio Frequency Interference Filter for Weather Radars." Journal of Atmospheric and Oceanic Technology 34, 7 (Jun. 2017): 1393-1406. (Year: 2017).*

(Continued)

*Primary Examiner* — Erin F Heard
*Assistant Examiner* — Ismaaeel A. Siddiquee
(74) *Attorney, Agent, or Firm* — Maschoff Brennan; Paul G. Johnson

(57) ABSTRACT

A method to mitigate radio frequency interference (RFI) in weather radar data may include computing $\ell_p$ norms of radials of weather radar data to construct an $\ell_p$ norm profile of the weather radar data as a function of azimuth angle. The weather radar data may include Level 2 or higher weather radar data in polar format. The method may include determining that a given radial in the weather radar data is an RFI radial based on the $\ell_p$ norm profile of the weather radar data. The method may include displaying an image from the weather radar data in which at least one of: the RFI radial is identified in the image as including RFI; or the RFI radial is omitted from the image.

20 Claims, 15 Drawing Sheets

(56) References Cited

U.S. PATENT DOCUMENTS

| | | | |
|---|---|---|---|
| 2008/0143588 A1* | 6/2008 | Alford | G01S 13/95 |
| | | | 342/26 R |
| 2011/0050486 A1 | 3/2011 | Ishizawa et al. | |
| 2012/0086596 A1* | 4/2012 | Insanic | G01S 7/003 |
| | | | 342/26 D |
| 2016/0080737 A1* | 3/2016 | Tezaur | H04N 17/002 |
| | | | 348/188 |
| 2019/0096217 A1* | 3/2019 | Pourmohammad | H04W 4/021 |

OTHER PUBLICATIONS

Cho, J. Y. N.; "A new radio frequency interference filter for weather radars"; Journal of Atmospheric and Oceanic Technology.; vol. 34; Jul. 2017; 14 pages.

Keränen, R., L. Rojas, and P. Nyberg; "Progress in mitigation of WLAN interferences at weather radar"; 36th Conference on Radar Meteorology; Breckenridge, CO; American Meteorology Soc.; 2013; 8 pages.

Peura, M.; "Computer vision methods for anomaly removal"; Proceedings of the Second European Conference on Radar Meteorology; Delft, Netherlands; ERAD, 2002; 6 pages.

Rojas, L., D. N. Moisseev, V. Chandrasekar, J. Selzler, and R. Keränen; "Dual-polarization spectral filter for radio frequency interference suppression"; The Seventh European Conference on Radar in Meteorology and Hydrology (ERAD 2012); May 27, 2012; Toulouse, France, Météo-France; 6 pages.

Donoho, David. L.; "Compressed sensing"; IEEE Transactions on Information Theory; vol. 52, No. 4; Apr. 2006; 18 pages.

Ge, F., and L. He; "A de-noising method based on L0 gradient minimization and guided filter for ancient Chinese calligraphy works on steles"; EURASIP Journal on Image and Video Processing; 2019:32; 10 pages.

Lim, S., V. Chandrasekar, and V. N. Bringi; "Hydrometeor classification system using dual-polarization radar measurements: Model improvements and in situ verification"; IEEE Transactions Geoscience and Remote Sensing; Apr. 2005; vol. 43, 10 pages.

Xu, L., C. Lu, Y. Xu, and J. Jia; Dec. 2011; "Image smoothing via L0 gradient minimization"; ACM Transactions Graphics; vol. 30, Article 174; 12 pages.

Extended Search Report and Written Opinion in EP 21194674.4 dated Jan. 25, 2022.

Zhou et al. "A Study on Removal of Radial Interference Echo with Weather Radar" Multimedia Technology, 2010 International Conference on, IEEE Oct. 29, 2010, pp. 1-5 XP031797866 DOI: 10.1109/ICMULT.2010.5631375.

Norm (mathematics) Wikipedia (as of Aug. 24, 2020), https://en.wikipedia.org/w/index.php?title=Norm_(mathematics)&oldid=974624049, retrieved May 31, 2022, 12 pgs.

* cited by examiner

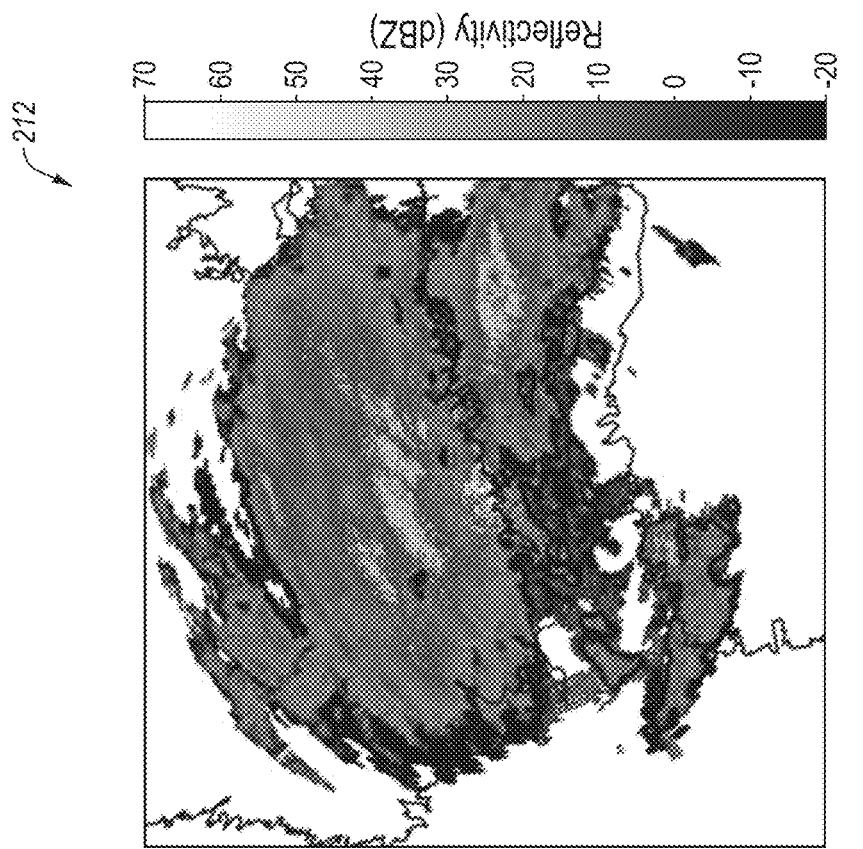
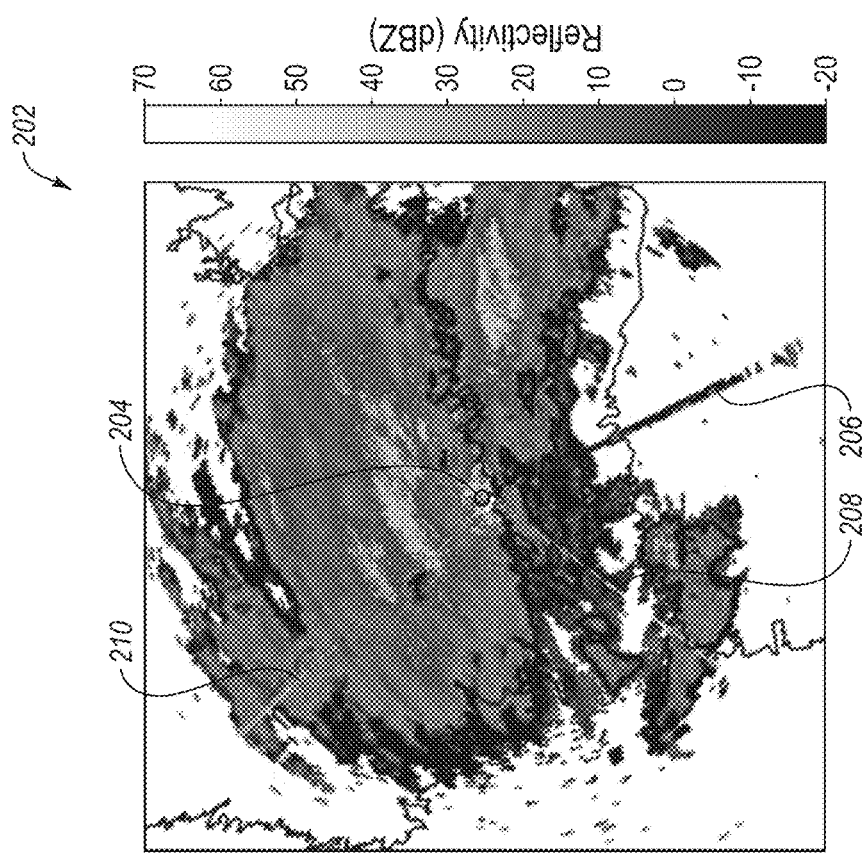
FIG. 2

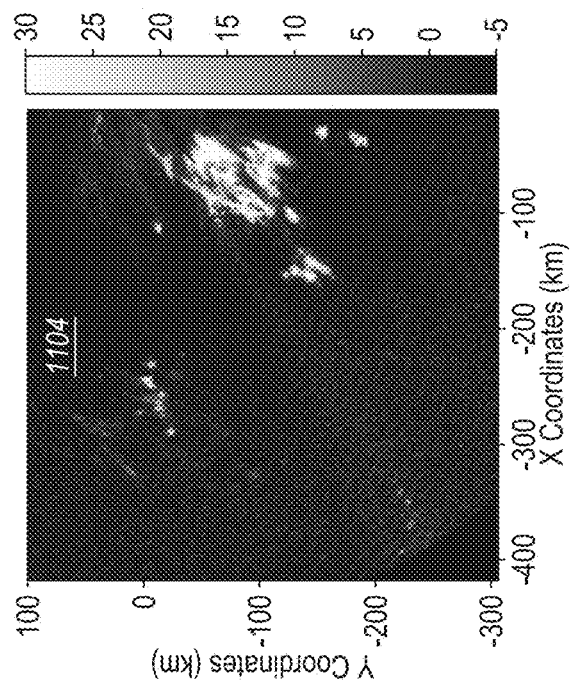
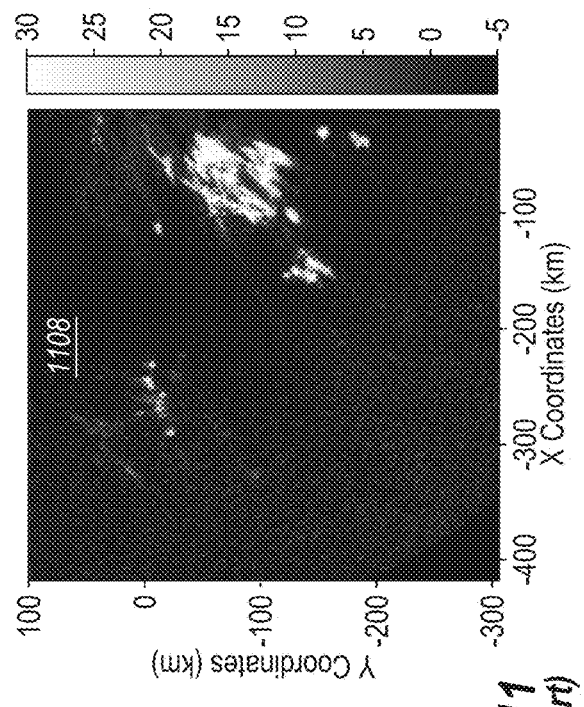
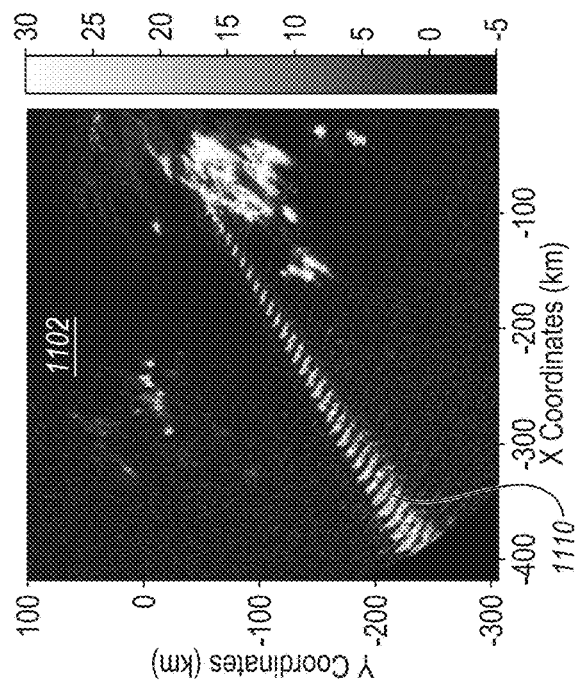
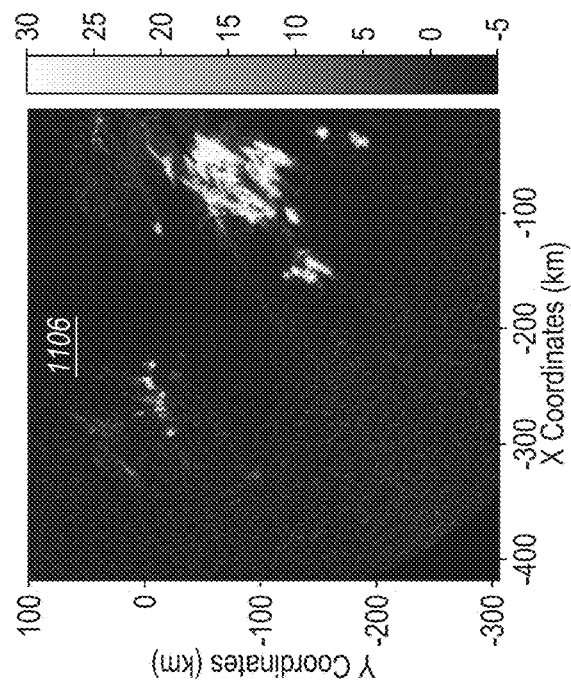
*FIG. 11*
*(Prior Art)*

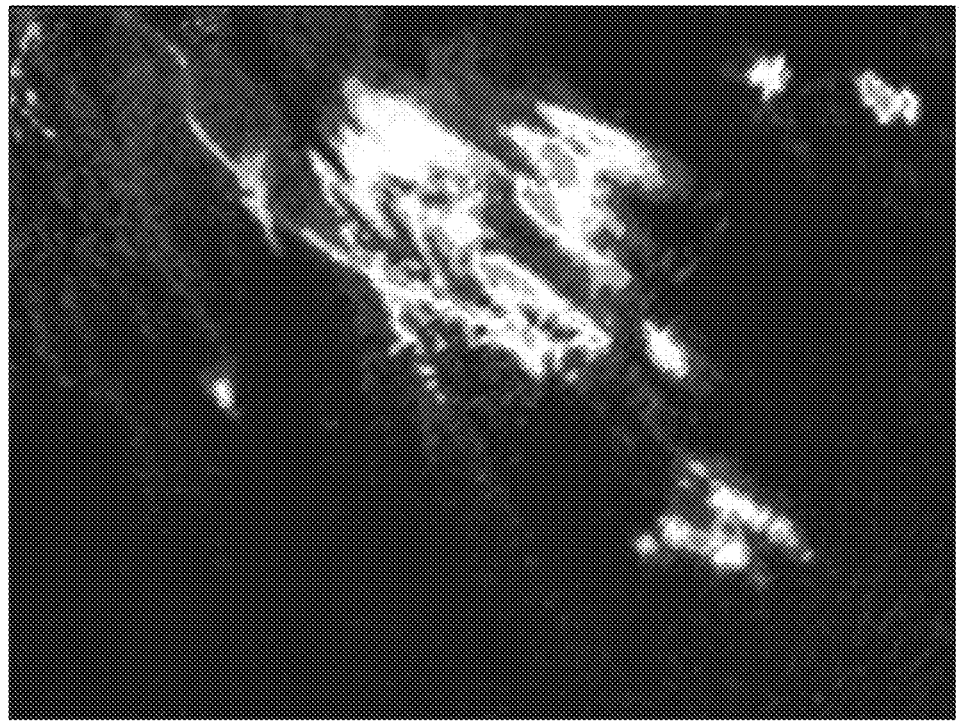
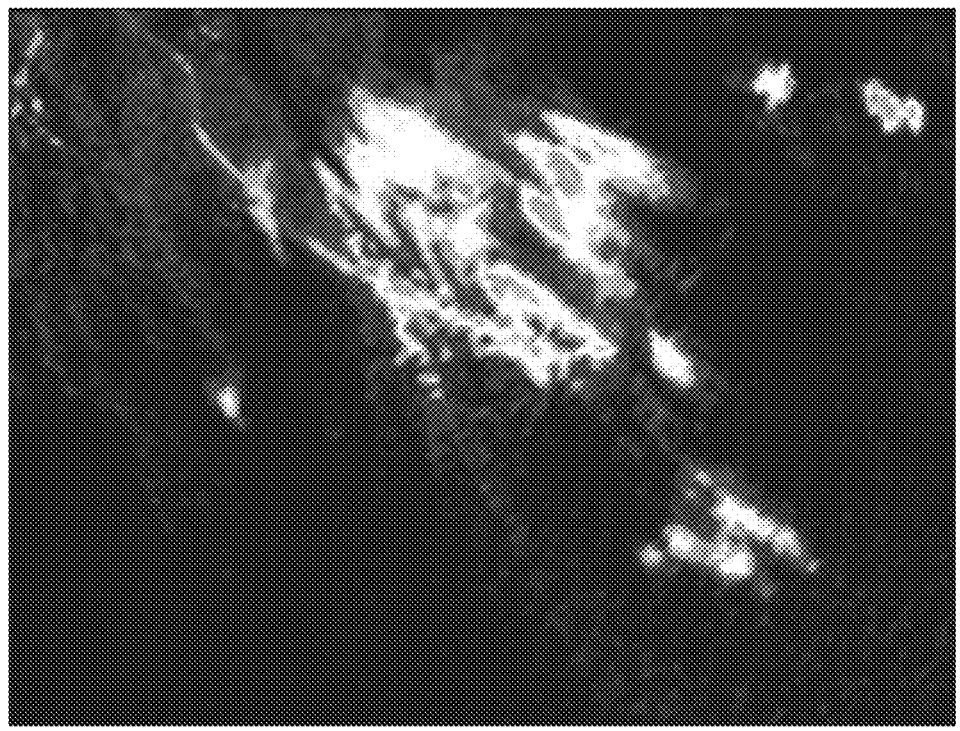
FIG. 12
(Prior Art)

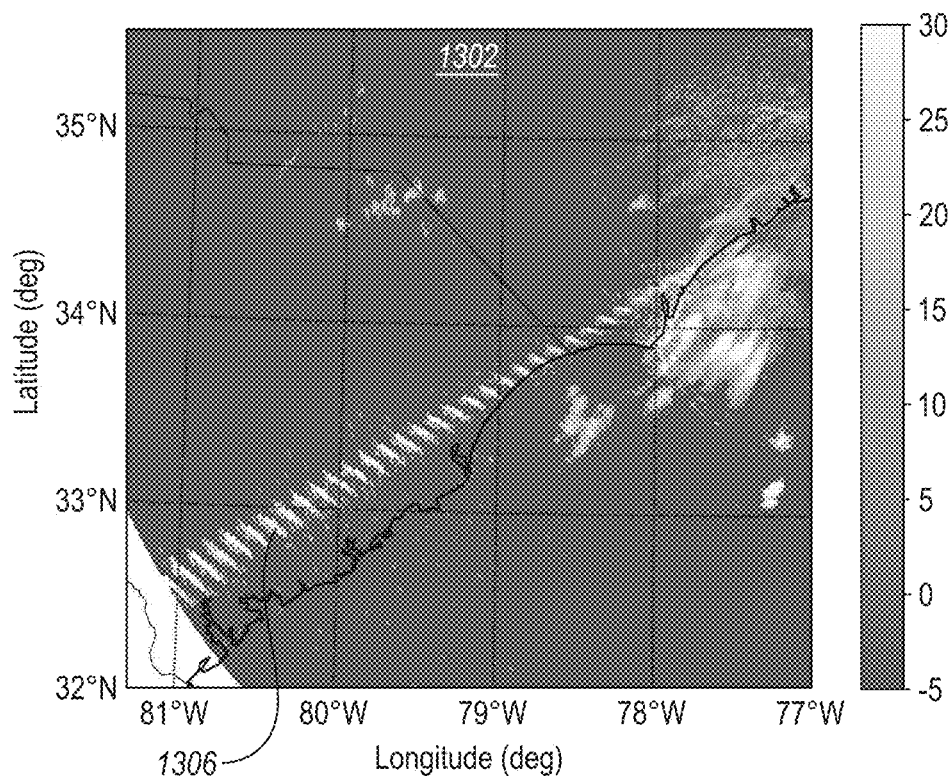
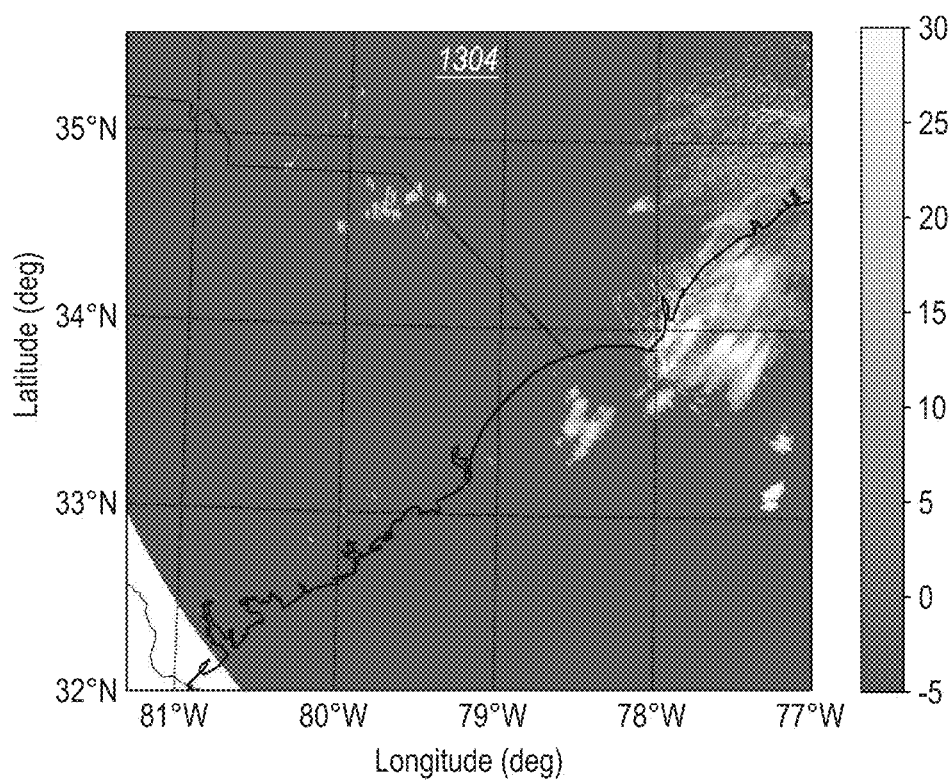
FIG. 13

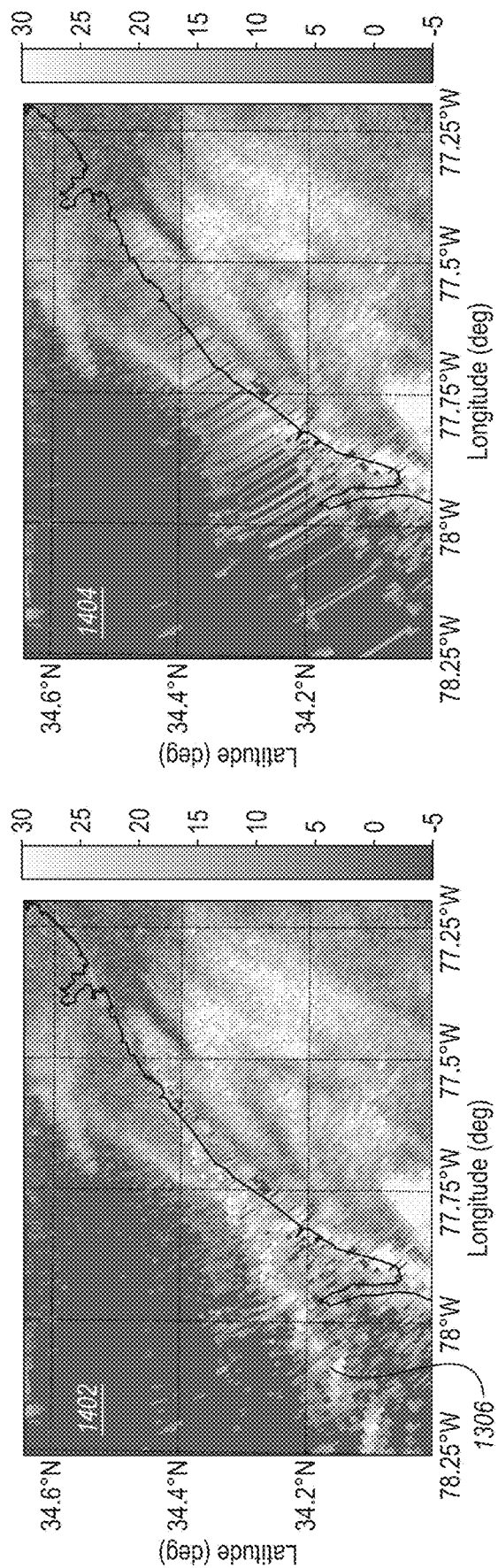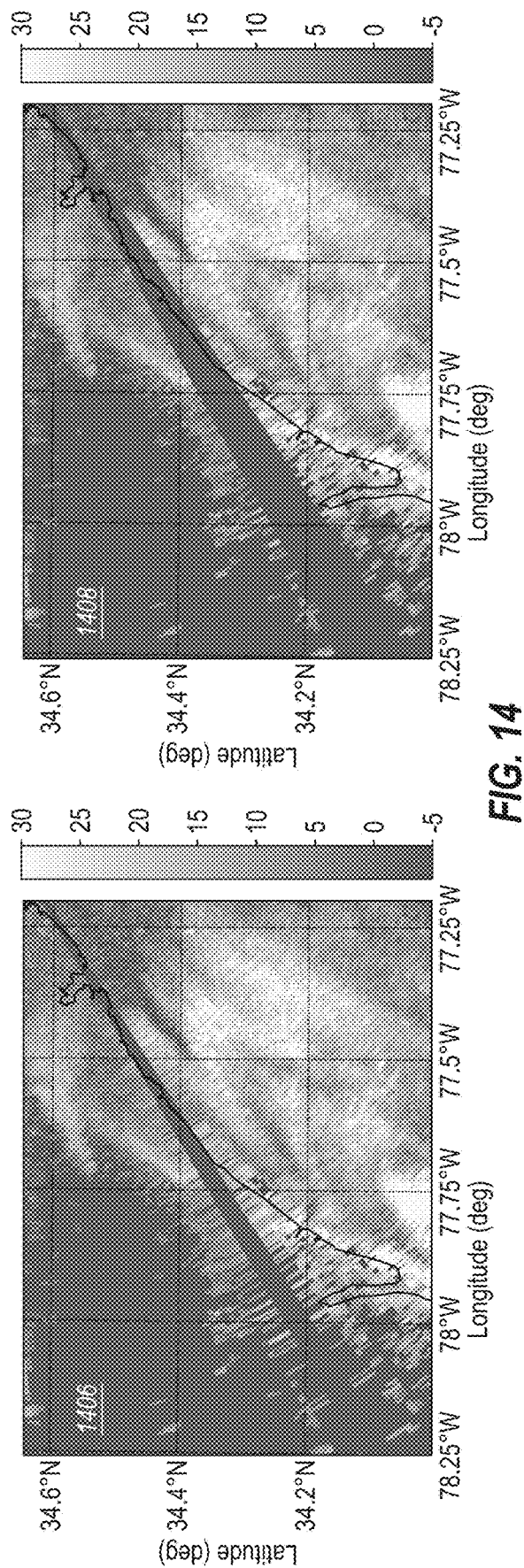
FIG. 14

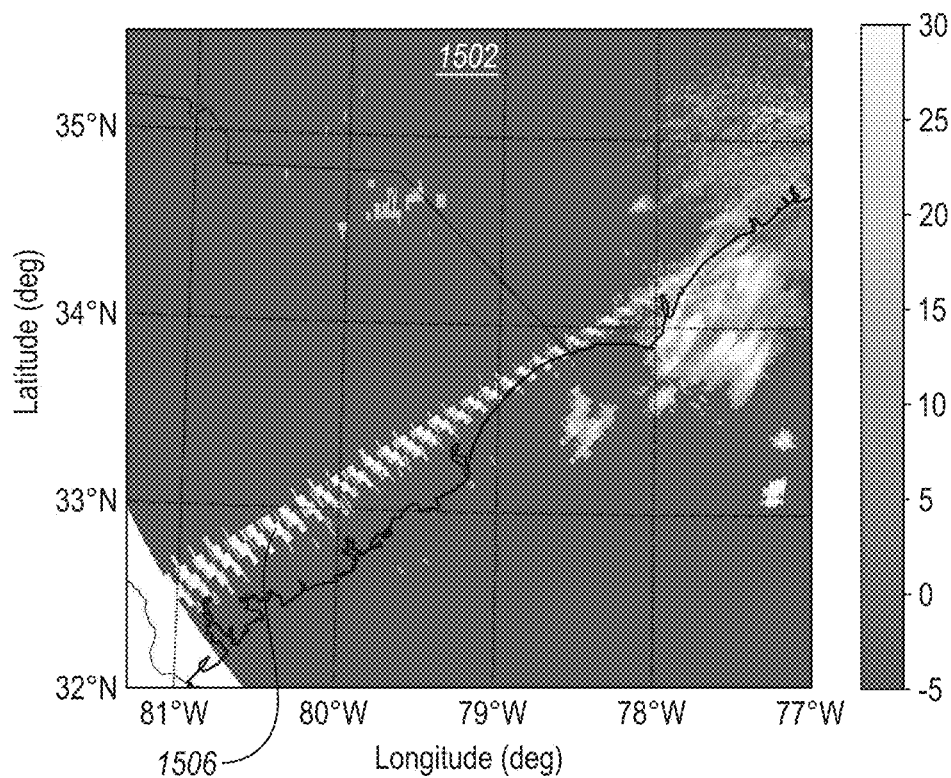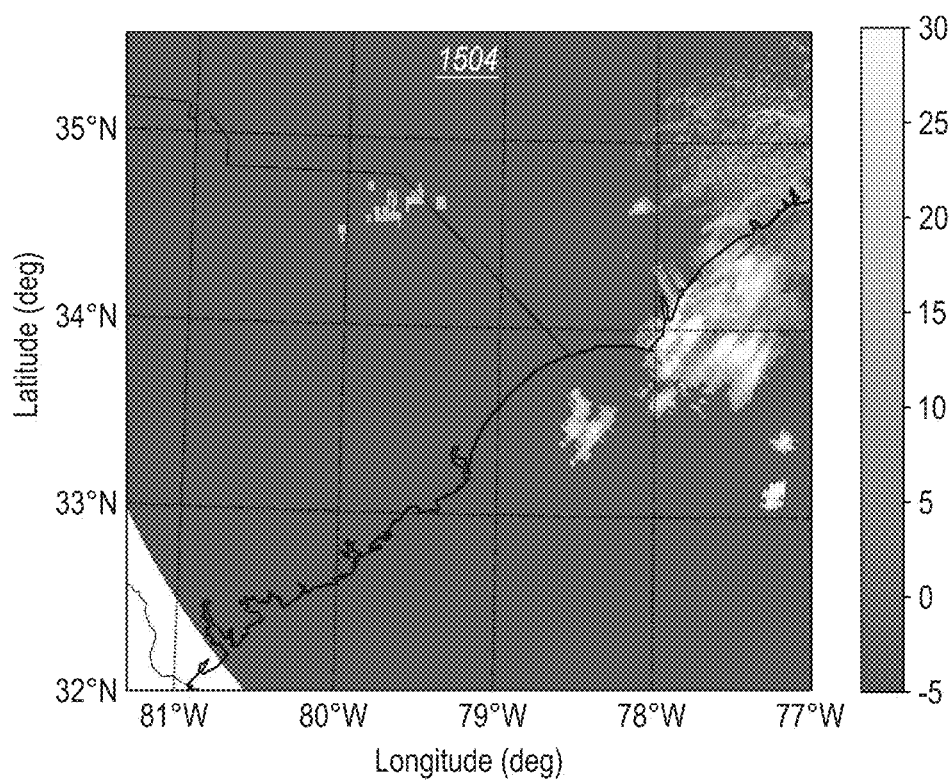
FIG. 15

RFI MITIGATION IN WEATHER RADAR DATA

FIELD

The embodiments discussed herein are related to radio frequency interference (RFI) mitigation in weather radar data.

BACKGROUND

Unless otherwise indicated herein, the materials described herein are not prior art to the claims in the present application and are not admitted to be prior art by inclusion in this section.

Current operational weather radars operate within the radio frequency (RF) spectrum, a resource under increasing demand by various users and devices for, e.g., communications, remote sensing, and navigation. The increasing demand for and utilization of the RF spectrum has led to a significant increase in RFI for weather radar. RFI can significantly degrade the quality of weather radar observations, preventing the retrieval of desired meteorological information and presenting false data that might be mistaken for actual atmospheric observations.

Degradation of weather radar data resulting from RFI can occur in many radar systems, including those that use a solid-state power amplifier (SSPA) and/or pulse compression, due to the relatively short duty cycle and large receiver bandwidth used, respectively. Although regulations exist governing the use of the RF spectrum, the problem of RFI in weather radar observations continues to grow.

The subject matter claimed herein is not limited to embodiments that solve any disadvantages or that operate only in environments such as those described above. Rather, this background is only provided to illustrate one example technology area where some embodiments described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In an example embodiment, a method to mitigate RFI in weather radar data may include computing $\ell_p$ norms of radials of weather radar data to construct an $\ell_p$ norm profile of the weather radar data as a function of azimuth angle. The weather radar data may include Level 2 or higher weather radar data in polar format. The method may include determining that a given radial in the weather radar data is an RFI radial based on the $\ell_p$ norm profile of the weather radar data. The method may include displaying an image from the weather radar data in which at least one of: the RFI radial is identified in the image as including RFI; or the RFI radial is omitted from the image.

In another example embodiment, a non-transitory computer-readable medium has computer-readable instructions stored thereon that are executable by a processor to perform or control performance of various operations. The operations may include computing $\ell_p$ norms of all radials of weather radar data to construct an $\ell_p$ norm profile of the weather radar data as a function of azimuth angle. The weather radar data may include Level 2 or higher weather radar data in polar format. The operations may include determining that a given radial in the weather radar data is an RFI radial based on the $\ell_p$ norm profile of the weather radar data. The operations may include displaying an image from the weather radar data in which at least one of: the RFI radial is identified in the image as including RFI; or the RFI radial is omitted from the image.

In another example embodiment, a method includes computing $\ell_p$ norms of radials of weather radar data to construct an $\ell_p$ norm profile of the weather radar data as a function of azimuth angle. The weather radar data may include Level 2 or higher weather radar data in polar format. The weather radar data in polar format may include, for each data point, a magnitude of the corresponding data point and a location of the corresponding data point, the location specified by a radial distance and azimuth angle. Each radial may include all data points that have an azimuth angle within a given range of azimuth angles across a radial distance range for each azimuth angle within the given range of azimuth angles. The method may include computing the derivative of the $\ell_p$ norm profile with respect to azimuth angle. The method may include obtaining an RFI kernel by one of: computing a template RFI kernel to use as the RFI kernel, the template RFI kernel including an approximation of typical radials in an azimuthal neighborhood of RFI; deriving a wavelet RFI kernel to use as the RFI kernel, the wavelet RFI kernel derived from data that represents an actual RFI radial and neighboring radials; or deriving an average wavelet RFI kernel to use as the RFI kernel, the average wavelet RFI kernel derived from data that represents multiple actual RFI radials and respective neighboring radials. The method may include computing a convolution of the derivative of the $\ell_p$ norm profile with the RFI kernel. The method may include determining that a given radial in the weather radar data includes an RFI radial based on the $\ell_p$ norm profile of the weather radar data, including determining that the convolution exceeds a threshold at an azimuth angle of the given radial. The method may include displaying an image from the weather radar data in which at least one of: the RFI radial is identified in the image as including RFI; or the RFI radial is omitted from the image.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 2 includes a weather radar image that represents weather radar data in polar format;

FIG. 11 includes various weather radar data images that provide a comparison of performance of three different RFI filtering techniques described in Cho, J. Y. N., 2017: A new radio frequency interference filter for weather radars. *J. Atmos. Oceanic Technol.*, 34. 1393-1406 (hereinafter "Cho" or the "Cho paper");

FIG. 12 includes detail images of portions of two of the images of FIG. 11;

FIG. 13 includes weather radar data images that show example performance of the method of FIG. 4 when applied to reflectivity data that closely resembles but does not exactly match data used by Cho;

FIG. 14 includes detail images of portions of the images of FIG. 13; and

FIG. 15 includes weather radar data images that show example performance of the method of FIG. 4 when applied to Level 3 reflectivity data from a same radar system and time as Level 2 reflectivity data used in FIGS. 13-14.

DESCRIPTION OF EMBODIMENTS

Figure 1:
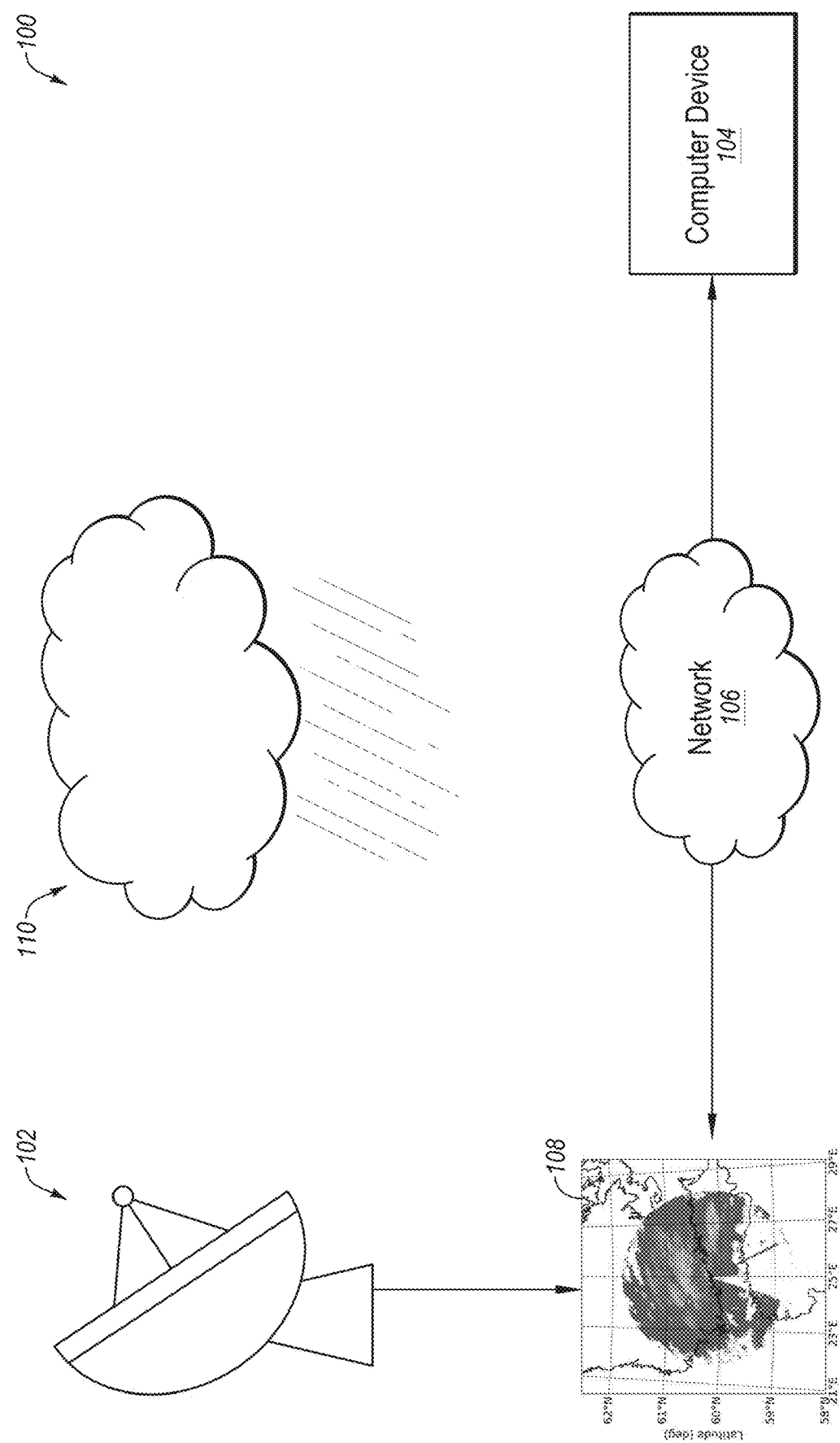
FIG. 1 illustrates an example system to generate weather radar data and mitigate RFI in the weather radar data.

Some embodiments herein compute $\ell_p$ norms of radials of data in polar format. Each radial may include all data points having an azimuth angle within a given range of azimuth angles across a radial distance range for each azimuth angle within the range of azimuth angles. The range of azimuth angles may span a single degree or multiple degrees. Stated another way, a radial may include all data points across a radial distance range for a single-degree bin of azimuth angles or a multi-degree bin of azimuth angles. Where a given radial includes data points each having an azimuth angle within a multi-degree range of azimuth angles, the range of azimuth angles may include a center azimuth angle +/−some offset.

Some RFI mitigation techniques for weather radars are disclosed in Cho, J. Y. N., 2017: A new radio frequency interference filter for weather radars. *J. Atmos. Oceanic Technol.*, 34. 1393-1406 (hereinafter "Cho" or the "Cho paper"). Cho specifically describes three RFI mitigation techniques: (1) the "Vaisala-3" algorithm, (2) a 1D median filter, and (3) a 2D median filter. Of the three techniques, only the Vaisala-3 algorithm is operational. The three techniques generally exhibit poor performance in the identification of RFI, particularly when coincident with precipitation, or are too computationally intense for real-time or near real-time identification of RFI in weather radar data.

Embodiments described herein generally mitigate RFI (e.g., identify and/or remove) better than the three techniques described in Cho and/or sufficiently quickly to be used in real-time or near real-time identification of RFI in weather radar data. In general, embodiments described herein identify RFI in Level 2 or higher weather radar data and optionally remove the RFI and/or impute the removed data. Because RFI is fundamentally characterized by a radially streaked nature that is apparent in images of Level 2 and Level 3 data, embodiments described herein may treat Level 2 and Level 3 data as images and thereby take an image processing approach to mitigate RFI.

As indicated, weather radar data may include at least Level 2 and Level 3 weather radar data, which is derived from Level 1 weather radar data. As used herein, Level 1 weather radar data refers to and includes a time series of complex voltage samples of radar returns generated by a radar system. In comparison, Level 2 weather radar data refers to and includes the data resulting from processing and creating data from the Level 1 weather radar data. Similarly, Level 3 weather radar data refers to and includes the data resulting from processing and creating data from the Level 2 weather radar data. Level 2 weather radar data may include data products such as reflectivity data, differential reflectivity data, normalized coherent power/signal quality index data, differential phase data, mean radial velocity data, correlation coefficient ($\rho_{hv}$) data, radar echo classification data, spectrum width data, total power data, linear depolarization ratio (LDR) data, specific differential phase ($K_{DP}$) data, or other Level 2 data products. Level 3 weather radar data may include data products such as base and composite reflectivity data, storm relative velocity data, vertical integrated liquid data, echo tops and VAD wind profile data, precipitation products such as estimated ground accumulated rainfall amounts for one and three hour periods, storm totals, and digital arrays, or other Level 3 data products.

RFI may present differently in Level 2 (or higher) data products than it does in Level 1 data (e.g., the time series of complex voltage samples of radar returns), which is leveraged according to some embodiments herein for the identification of RFI. Although not required, some embodiments analyze multiple Level 2 data products to form a "consensus"; for example, if the analysis of a first Level 2 data product identifies RFI at first and second locations and the analysis of a different second Level 2 data product identifies RFI only at the first location, the consensus determination may be that only the RFI at the first location is identified as such. Accordingly, some embodiments herein provide "different looks" at the same underlying Level 1 data (e.g., through analysis of at least two different Level 2 data products generated from the same underlying Level 1 data). In such a consensus approach, different Level 2 (or higher) data products are used where each is based on weather radar data collected from a given area at a given time. Such a consensus approach may facilitate identification of RFI in weather radar data, including RFI that is coincident with precipitation, which is one of the most challenging scenarios for RFI identification.

Some embodiments herein may compute $\ell_p$ norms of radials of weather radar data to construct an $\ell_p$ norm profile of the weather radar data as a function of azimuth angle, where the weather radar data includes Level 2 or higher weather radar data in polar format. Such an $\ell_p$ norm profile may be referred to as a radial $\ell_p$ norm profile. In some embodiments, before computing the $\ell_p$ norms of the radials, one or more thresholds may be applied to the weather radar data to suppress noise and precipitation that may be coincident with the RFI. The $\ell_p$ norms according to embodiments herein may include the to norm, the Manhattan Distance, the Euclidian Norm, or other suitable $\ell_p$ norm.

Some embodiments may determine whether radials in the weather radar data include RFI, e.g., are RFI radials, based on the radial $\ell_p$ norm profile of the weather radar data. In this and other embodiments, a kernel may be computed that is associated with or indicative of RFI, a derivative of the radial $\ell_p$ norm profile with respect to azimuth angle may be computed, and a convolution of the derivative of the radial $\ell_p$ norm profile with the kernel may be computed. When the convolution exceeds a threshold at any given azimuth angle, the corresponding radial at the given azimuth angle may be determined to be or marked as an RFI radial. An image of the weather radar data may then be displayed in which any RFI radials are identified in the image as including RFI and/or are omitted from the image. In some cases where the RFI radials are omitted from the image, replacement data that replaces the omitted data may be completely or partially imputed from surrounding radials and may be displayed in the image. Alternatively or additionally, prior to displaying the image, the weather radar data may be despeckled and masked or otherwise processed to remove noise from the image.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

FIG. 1 illustrates an example system 100 to generate weather radar data and mitigate RFI in the weather radar data, arranged in accordance with at least one embodiment described herein. The system 100 may include a radar system 102, a computer device 104, and a network 106. The radar system 102 may generate weather radar data 108. The computer device 104 may obtain the weather radar data 108 from the radar system 102 through the network 106 and may analyze it to identify RFI in the weather radar data 108. Alternatively or additionally, the weather radar system 102 or other computer device or server may analyze the weather radar data 108 to identify RFI in the weather radar data 108. If the weather radar data 108 is Level 1 weather radar data, the computer device 104 or the radar system 102 itself may convert the weather radar data 108 to or use it to generate one or more Level 2 or higher data products in polar format before the computer device 104 or the radar system 102 analyzes it to identify RFI therein.

Although illustrated with a single radar system 102 and a single computer device 104, more generally the system 100 may include one or more radar systems 102 and one or more computer devices 104. In some embodiments, the system 100 may further include one or more client devices that can access data and/or services available at or provided by the computer device 104. For example, subscribers to a weather radar data service provided by the computer device 104 may use corresponding client devices to access the weather radar data 108 over the network 106 from the computer device 104. In some embodiments, RFI may be identified in and/or removed from the weather radar data 108 by the computer device 104 (or other device) before being provided to the client devices.

In general, the network 106 may include one or more wide area networks (WANs) and/or local area networks (LANs) that enable the radar system 102, the computer device 104, and the client devices to communicate with each other. In some embodiments, the network 106 may include the Internet, including a global internetwork formed by logical and physical connections between multiple WANs and/or LANs. Alternately or additionally, the network 106 may include one or more cellular radio frequency (RF) networks, a voice over Internet Protocol (VOIP) network, a public switched telephone network (PSTN), and/or one or more wired and/or wireless networks such as 802.xx networks, Bluetooth access points, wireless access points, Internet Protocol (IP)-based networks, or other wired and/or wireless networks. The network 106 may also include servers that enable one type of network to interface with another type of network.

In general, the radar system 102 may transmit electromagnetic waves (e.g., microwaves) towards a region of interest (e.g., an atmospheric region, an environmental region, etc.) or object of interest. The radar system 102 may receive reflections of the electromagnetic waves off of an object or objects, such as a storm system or precipitation 110 (e.g., rain, ice, sleet, hail, etc.) and may generate a time series of complex voltage samples from the received reflections. Such reflections may be referred to as reflectivity and the generated time series may be referred to as reflectivity data, which is a Level 1 data product. Any processing, filtering, or accumulation of the reflectivity data may be performed, for example, by the radar system 102 and/or the computer device 104. The weather radar data 108 provided by the radar system 102 to the computer device 104 may include the reflectivity data and/or one or more Level 2 or higher data products generated from the reflectivity data.

FIG. 2 includes a weather radar image (hereinafter "image") 200 that represents weather radar data in polar format, arranged in accordance with at least one embodiment described herein. The weather radar data from which the image 202 is generated was part of a weather radar data set collected by a VAISALA dual-polarization C-band SSPA prototype 204 at Kumpula, Helsinki, Finland, on Mar. 10, 2019. The foregoing SSPA prototype is an example of the radar system 102 of FIG. 1 and is referred to hereinafter as radar system 204. The foregoing weather radar data set is hereinafter referred to as the Kumpula data set. The Kumpula data set is an example of the weather radar data 108 of FIG. 1. The image 202 has three readily identifiable RFI radials 206, 208, 210 respectively at the following azimuths: about 150 degrees (or about 5 o'clock), about 210 degrees (or about 7 o'clock), and about 315 degrees (about 10:30).

With combined reference to FIGS. 1 and 2, the computer device 104, the radar system 102, 204, or other computing resources may take one or more of the following actions to process and analyze the weather data 108 for RFI. For example, the computer device 104 may compute $\ell_p$ norms of radials of the weather radar data 108, such as of the weather radar data used to generate the image 202. In some embodiments, prior to computing the $\ell_p$ norms of the radials, the computer device 104 may convert the weather radar data 108 to one or more Level 2 or higher data products and/or may convert the weather radar data 108 to polar format if not already in the polar format.

In some embodiments, weather radar data in polar format may include, for each data point, a magnitude of the corresponding data point and a location of the corresponding data point specified by a radial distance from the radar system 102, 204 and azimuth angle, where North may be considered an azimuth of 0 degrees. Computing the $\ell_p$ norms, and specifically the $\ell_0$ norms, may include determining, for each radial, a number of data points in the corresponding radial that have a non-zero magnitude. In an example, each radial may include all data points with a given azimuth angle across a radial distance range. For example, the RFI radial 206 of FIG. 2 may include all data points of the weather radar data used to generate the image 202 that have an azimuth of about 150 degrees. More generally, each radial may include all data points having an azimuth angle within a given range of azimuth angles across a radial distance range for each azimuth angle within the range of azimuth angles. The radial distance range may extend from the radar system 102, 204 (e.g., radial distance=0) or other minimum range to a resolution distance of the radar or other maximum range.

In some embodiments, the computer device 104 may apply a threshold to the weather radar data 108 to suppress noise and precipitation that may be coincident with the RFI prior to computing the $\ell_p$ norms. For example, each of the RFI radials 208, 210 is coincident with precipitation in the image 202 of FIG. 2; applying a threshold of about 19 decibels relative to Z (dBz) would suppress noise and precipitation that is coincident with the RFI radial 208 or applying a threshold of about 25 dBz would suppress noise and precipitation that is coincident with the RFI radial 210. Alternatively or additionally, multiple thresholds may be iteratively applied to the weather radar data 108 with computation of $\ell_p$ norms to build a corresponding radial $\ell_p$ norm profile after application of each threshold. The application of multiple thresholds and building of multiple radial $\ell_p$ norm profiles may serve to identify RFI that manifests in the weather radar data 108 with different amplitudes that in some cases may be coincident with precipitation or other objects that also manifest in the weather radar data.

For example, a first threshold (e.g., of 0 dBz) may not suppress noise or precipitation relative to any of the RFI radials 206, 208, 210 but the RFI radial 206 would nevertheless be manifest in a corresponding first radial $\ell_p$ norm profile since it is generally not coincident with precipitation. A second threshold (e.g., of 19 dBz) may suppress noise or precipitation relative to the RFI radial 208, while also suppressing the RFI radial 206 and without suppressing noise or precipitation relative to the RFI radial 210 such that only the RFI radial 208 would be manifest in a corresponding second radial $\ell_p$ norm profile. A third threshold (e.g., of 25 dBz) may suppress noise or precipitation relative to the RFI radial 210, while also suppressing the RFI radials 206, 208, such that only the RFI radial 210 would be manifest in a corresponding third radial $\ell_p$ norm profile. Thus, although the RFI radials 206, 208, 210 have different amplitudes in the image 202, the iterative application of multiple thresholds to the weather radar data 108 may serve to suppress noise and precipitation relative to the RFI radials 206, 208, 210 so they may manifest in corresponding radial $\ell_p$ norm profiles and may be identified, e.g., by subsequent processing of the radial $\ell_p$ norm profiles as described herein.

Where multiple Level 2 data products are considered for a consensus, the computation of $\ell_p$ norms to build radial $\ell_p$ norm profiles and/or the iterative application of thresholds to build multiple radial $\ell_p$ norm profiles may be performed for each Level 2 data product. Where one or more radial $\ell_p$ norm profiles are generated for each of multiple Level 2 data products, the radial $\ell_p$ norm profiles of the multiple Level 2 data products may be averaged, e.g., by the computer device 104, to form an average radial $\ell_p$ norm profile.

The computer device 104 may obtain an RFI kernel $k_{RFI}$ that is associated with or indicative of RFI. In an example, the RFI kernel $k_{RFI}$ may be obtained by computing a template RFI kernel to use as the RFI kernel $k_{RFI}$, the template RFI kernel including an approximation of typical radials in an azimuthal neighborhood of RFI, where the azimuthal neighborhood is defined as a range of azimuth angles (e.g., on the order of a few degrees, such as +/−6 degrees) adjacent to and on both sides of a radial identified as containing RFI. For instance, the template RFI kernel may be computed as $k_{RFI}(x)=e^x-1$ (for x=1, ..., 6) and $-e^x+1$ (for x=7, ..., 12). In another example, the RFI kernel $k_{RFI}$ may be obtained by deriving a wavelet RFI kernel to use as the RFI kernel $k_{RFI}$, the wavelet RFI kernel derived from data that represents an actual RFI radial and neighboring radials (e.g., radials within the azimuthal neighborhood). In another example, the RFI kernel $k_{RFI}$ may be obtained by deriving an average wavelet RFI kernel to use as the RFI kernel $k_{RFI}$, the average wavelet RFI kernel derived from data that represents multiple actual RFI radials and their respective neighboring radials.

The computer device 104 may compute a derivative with respect to azimuth angle of the radial $\ell_p$ norm profile computed previously to differentiate between RFI and precipitation. The radial $\ell_p$ norm profile for which the derivative is computed may include a single radial $\ell_p$ norm profile for a single Level 2 or higher data product, a set of radial $\ell_p$ norm profiles for the same Level 2 or higher data product (e.g., taken after application of different thresholds), an average of two or more single radial $\ell_p$ norm profiles for two or more Level 2 or higher data products, or an average of two or more sets of radial $\ell_p$ norm profiles for two or more Level 2 or higher data products. The radial $\ell_p$ norm profile for which the derivative is computed may be referred to as the radial $\ell_p$ norm profile B(θ). The derivative of the radial $\ell_p$ norm profile B(θ) may be referred to as the derivative B'(θ).

Figure 3:
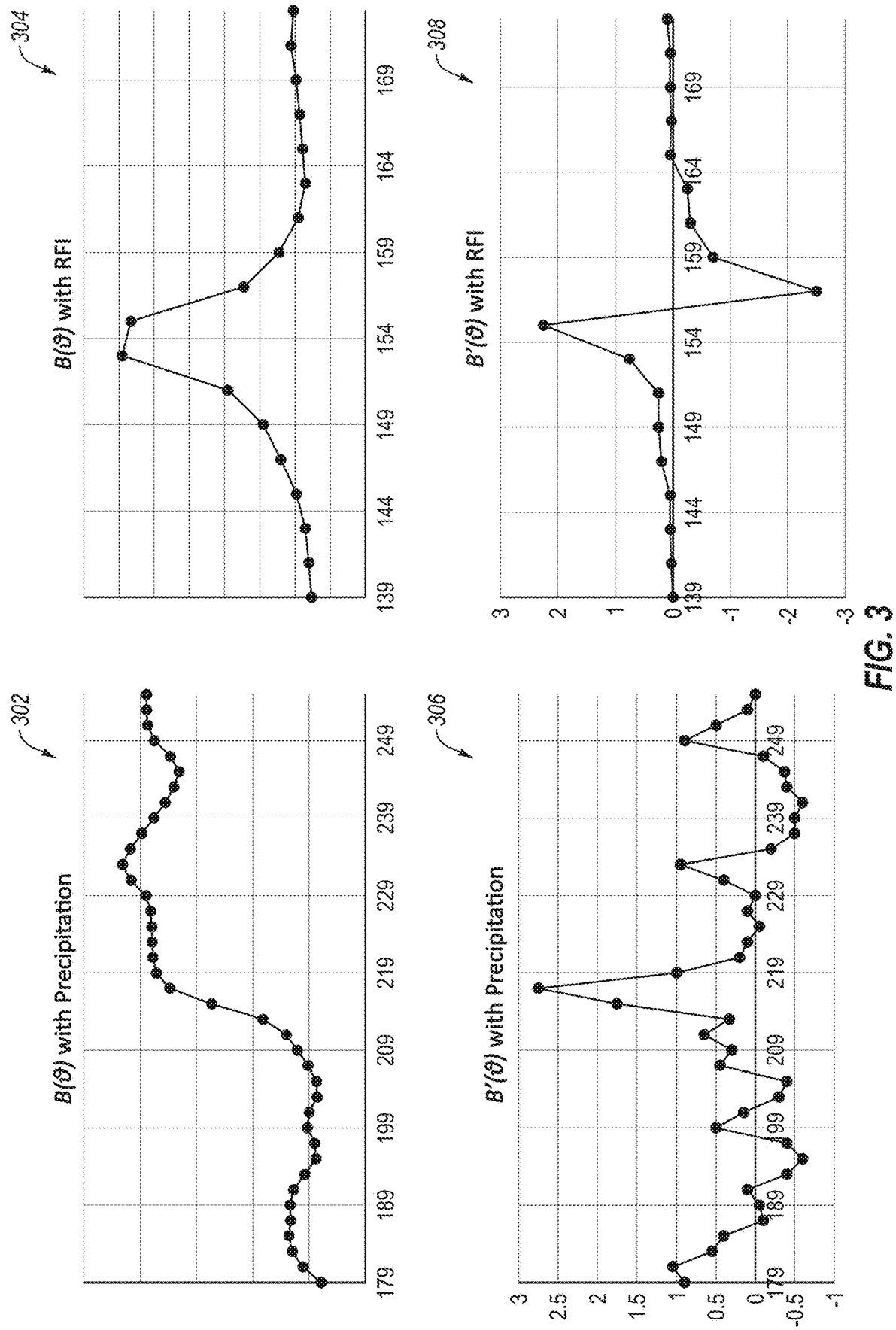
FIG. 3 includes first and second example radial $\ell_p$ norm profiles.

FIG. 3 includes first and second example radial $\ell_p$ norm (in this example, the $\ell_0$ norm) profiles B(θ) 302, 304 (or portions thereof), arranged in accordance with at least some embodiments described herein. The first radial $\ell_0$ norm profile B(θ) 302 is for weather radar data with precipitation and an azimuthal angular resolution of 2 degrees. The second radial $\ell_0$ norm profile B(θ) 304 is for weather radar data with RFI and no precipitation, or with precipitation suppressed, e.g., by application of a threshold as described above, also with an azimuthal angular resolution of 2 degrees. Other embodiments may use weather radar data with the same or different azimuthal angular resolution.

FIG. 3 also includes example derivatives B'(θ) 306, 308. The derivative B'(θ) 306 is the derivative with respect to azimuth angle of the first radial $\ell_0$ norm profile B(θ) 302. Similarly, the derivative B'(θ) 308 is the derivative with respect to azimuth angle of the second radial $\ell_0$ norm profile B(θ) 304.

The derivative B'(θ) 308 of the second radial to norm profile 304 exhibits a sharp updown spike pair, e.g., for the RFI observed by weather radar (e.g., the radar system 102, 204), which feature is generally absent for precipitation observed by weather radar as indicated by the derivative B'(θ) 306 of the first radial $\ell_0$ norm profile B(θ) 302. The RFI kernel $k_{RFI}$ obtained by the computer device 104 may be based on this feature such that a convolution of a derivative of a given radial $\ell_p$ norm profile with the RFI kernel $k_{RFI}$ grows very large, e.g., in excess of a threshold, at each azimuth angle associated with such a sharp updown spike pair. For example, as previously indicated, the RFI kernel $k_{RFI}$ may be computed as, e.g., $k_{RFI}(x)=e^x-1$ (for x=1, ..., 6) and $-e^x+1$ (for x=7, ..., 12).

Returning to FIGS. 1 and 2, the computer device 104 may then compute a convolution R(θ) of the derivative B'(θ) with the RFI kernel $k_{RFI}$, e.g., $R(\theta)=B'(\theta)*k_{RFI}(\theta)$. The radial associated with any azimuth angle θ at which the convolution R(θ) exceeds a threshold t may be marked as and/or determined to be an RFI radial $r_{RFI}$.

The computer device 104 may delete all data of each RFI radial $r_{RFI}$ from the weather radar data 108. Alternatively or additionally, the computer device 104 may further process the weather radar data 108 for general noise removal by despeckling and masking. In some embodiments, the computer device 104 may further impute the deleted data using surrounding data, e.g., surrounding radials, from the weather radar data 108 that are not identified as containing RFI, e.g., as being an RFI radial $r_{RFI}$.

FIG. 2 further includes a weather radar image (hereinafter "image") 212 that generally represents the same weather radar data as the image 202, but with the RFI radials 206, 208, 210 identified, their corresponding data removed from the weather radar data, replacement data imputed for each, and further processing for general noise removal, e.g., according to the foregoing process. It can be seen from the image 212 that embodiments described herein can identify (and optionally remove) both isolated RFI, such as the RFI radial 206, as well as RFI that is coincident with precipitation, such as the RFI radials 208, 210.

Figure 4:
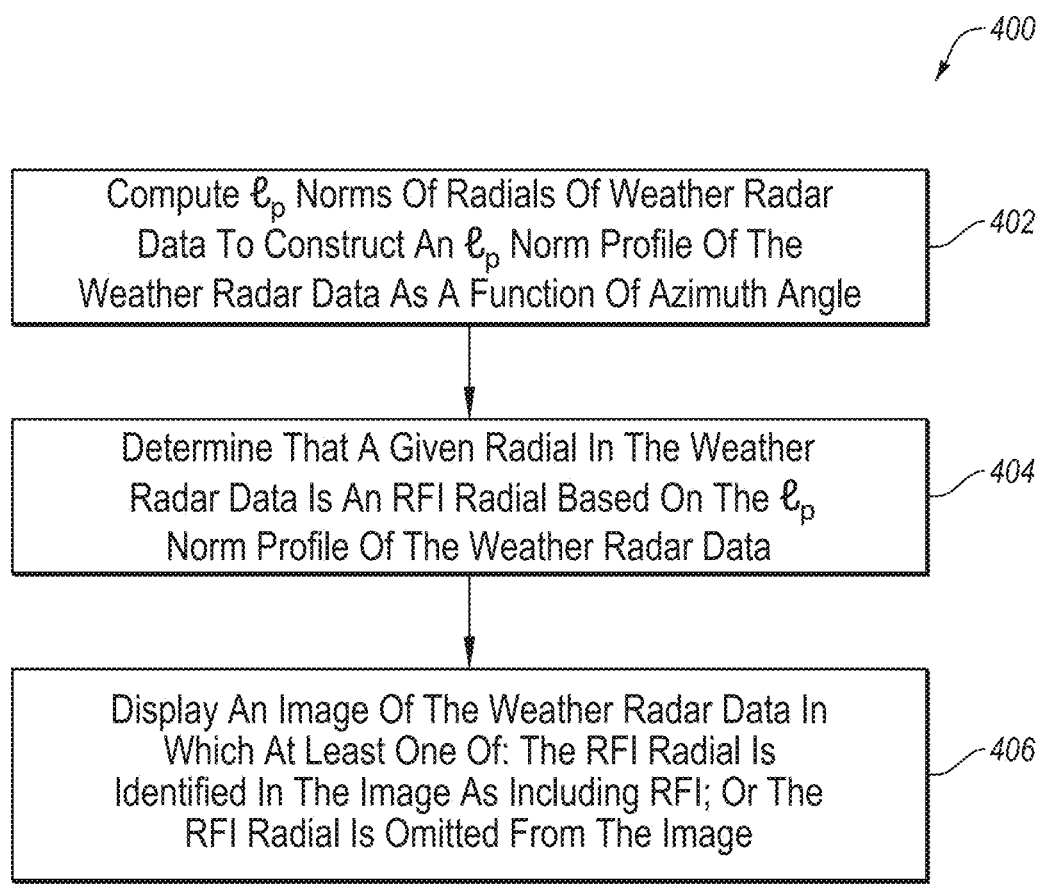
FIG. 4 is a flowchart of an example method to mitigate RFI in weather radar data.

FIG. 4 is a flowchart of an example method 400 to mitigate RFI in weather radar data, arranged in accordance with at least one embodiment described herein. The method 400 may be performed or controlled by, e.g., the computer device 104 of FIG. 1, computer resources of the radar system 102, or other device or system. Alternatively or additionally, the method 400 may be embodied by computer memory, storage, or other non-transitory computer-readable medium having computer-readable instructions stored thereon that are executable by a processor to perform or control performance of one or more operations of the method 400. The method 400 may include one or more of blocks 402, 404, or 406.

At block 402, the method 400 may include computing $\ell_p$ norms of radials of weather radar data to construct an $\ell_p$ norm profile of the weather radar data as a function of azimuth angle. The weather radar data may include Level 2 or higher weather radar data in polar format. Block 402 may be followed by block 404.

At block 404, the method 400 may include determining that a given radial in the weather radar data is an RFI radial based on the $\ell_p$ norm profile of the weather radar data. Block 404 may be followed by block 406.

At block 406, the method 400 may include displaying an image from the weather radar data in which at least one of: the RFI radial is identified in the image as including RFI; or the RFI radial is omitted from the image. Thus, the method 400 may be implemented as an RFI filter.

One skilled in the art will appreciate that, for the method 400 and other processes and methods disclosed herein, the functions or operations performed in the processes and methods may be implemented in differing order. Furthermore, the outlined steps and actions are only provided as examples, and some of the steps and actions may be optional, combined into fewer steps and actions, or expanded into additional steps and actions without detracting from the essence of the disclosed embodiments.

For example, the method 400 may further include deleting data points of the RFI radial from the weather radar data before displaying the image to cause the RFI radial to be omitted from the image when the image is displayed. The RFI radial may be omitted altogether from the image.

Alternatively or additionally, the method 400 may further include imputing at least some replacement data points for the deleted data points from data points of two or more non-RFI radials in the weather radar data that are near a location of the RFI radial. Non-RFI radials may be considered to be near an RFI radial if they are within a threshold angular range of the radial, such as within 2 degrees, 5 degrees, 10 degrees, or other angular range of the RFI radial. Imputing at least some replacement data points for the deleted data points from data points of two or more non-RFI radials in the weather radar data that are near the location of the RFI radial may include interpolating from each side of the RFI radial.

In some embodiments, the method 400 may further include, prior to computing the $\ell_p$ norms, applying a threshold to the weather radar data to suppress noise and precipitation data. Applying the threshold to the weather radar data to suppress noise and precipitation data may include temporarily disregarding each data point that has a magnitude below the threshold for computation of the $\ell_p$ norms. Alternatively or additionally, applying the threshold to the weather radar data to suppress noise and precipitation data may include temporarily zeroing out a magnitude of each data point for which the magnitude is below the threshold for computation of the $\ell_p$ norms.

As another example, the method 400 may further include determining that the given radial includes the RFI radial based on a consensus of first and second data products included in the weather radar data. In this and other embodiments, computing the $\ell_p$ norms of the radials of the weather radar data to construct the $\ell_p$ norm profile at block 402 may include computing first $\ell_p$ norms of radials of the first data product to construct a first $\ell_p$ norm profile. The method 400 may further include: computing second $\ell_p$ norms of radials of the second data product to construct a second $\ell_p$ norm profile; and averaging the first $\ell_p$ norm profile and the second $\ell_p$ norm profile to form an average $\ell_p$ norm profile. In this and other embodiments, determining that the given radial is the RFI radial based on the consensus of the first and second data products may include determining that the given radial is the RFI radial based on the average $\ell_p$ norm profile.

In some examples, determining that the given radial in the weather radar data is the RFI radial based on the $\ell_p$ norm profile of the weather radar data at block 404 includes determining that a convolution of a derivative of the $\ell_p$ norm profile with a RFI kernel exceeds a threshold at an azimuth angle of the given radial. In this and other embodiments, and prior to determining that the convolution exceeds the threshold, the method 400 may further include: computing the derivative of the $\ell_p$ norm profile with respect to azimuth angle; obtaining the RFI kernel; and computing the convolution. Obtaining the RFI kernel may include one of: computing a template RFI kernel to use as the RFI kernel, the template RFI kernel including an approximation of a typical RFI radial; deriving a wavelet RFI kernel to use as the RFI kernel, the wavelet RFI kernel derived from data that represents an actual RFI radial; or deriving an average wavelet RFI kernel to use as the RFI kernel, the average wavelet RFI kernel derived from data that represents multiple actual RFI radials.

Alternatively or additionally, the method 400 may further include, prior to displaying the image of the weather radar data, despeckling and masking the weather radar data to remove noise. In this and other embodiments, displaying the image of the weather radar data may include displaying the image of the despeckled and masked weather radar data.

Figure 5:
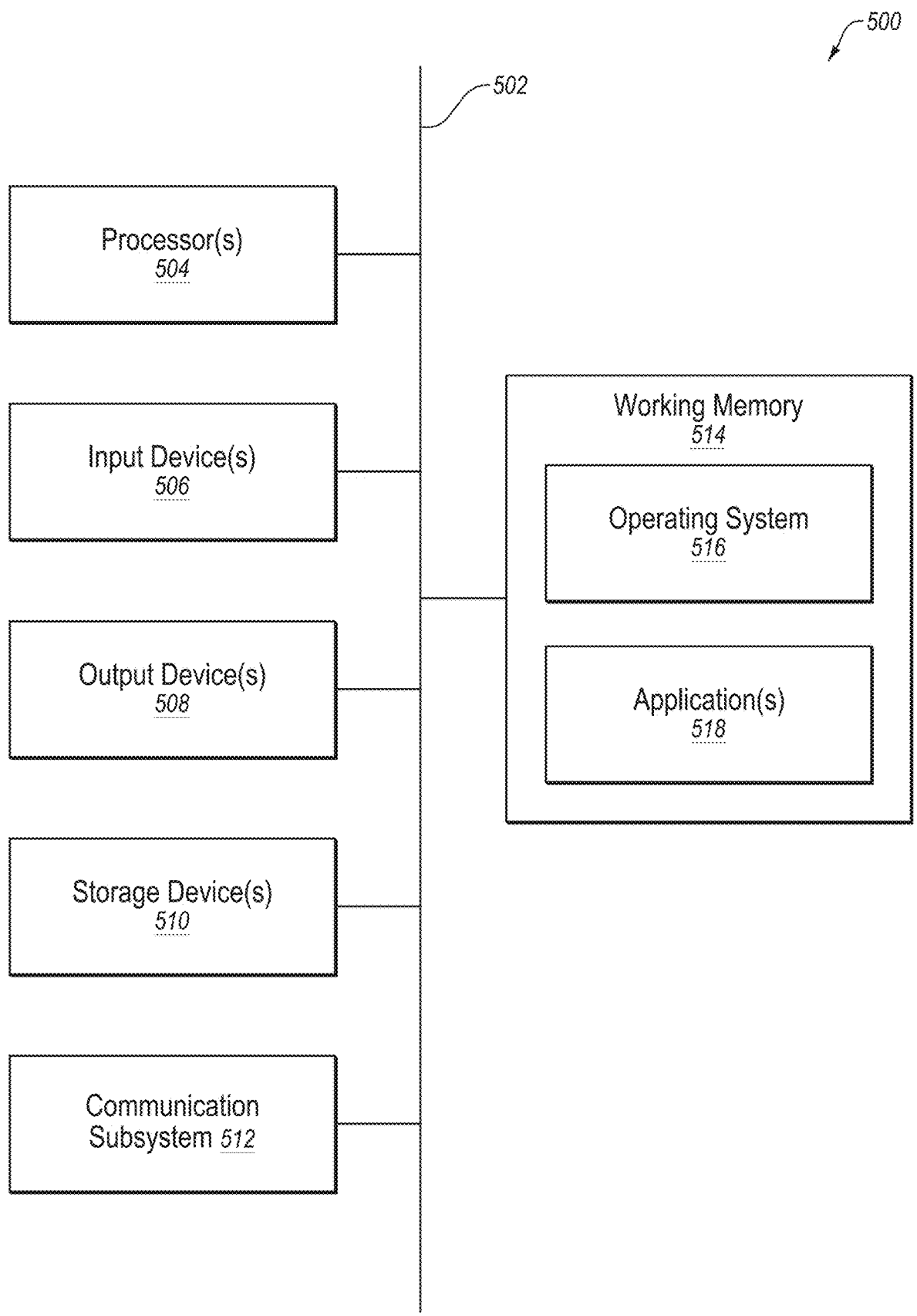
FIG. 5 illustrates an example computational system 500 to perform one or more operations of the present disclosure.

FIG. 5 illustrates an example computational system 500 to perform one or more operations of the present disclosure, arranged in accordance with at least one embodiment described herein. The computational system 500 may include, be included in, or correspond to the computer device 104, computational resources of the radar system 102, 204, and/or client devices of users that access data and/or services available at or provided by the computer device 104.

The computational system 500 (or processing unit) illustrated in FIG. 5 can be used to perform and/or control operation of any of the embodiments described herein. For example, the computational system 500 can be used alone or in conjunction with other components. As another example, the computational system 500 can be used to perform any calculation, solve any equation, perform any identification, and/or make any determination described here. As another example, the computational system 500 may be used to execute all or portions of the method 400 of FIG. 4.

The computational system 500 may include any or all of the hardware elements shown in FIG. 5 and described herein. The computational system 500 may include hardware elements that are electrically coupled via a bus 502 (or may otherwise be in communication, as appropriate). The hardware elements may include one or more processors 504, including one or more general-purpose processors and/or one or more special-purpose processors (such as digital signal processing chips, graphics acceleration chips, or other special-purpose processor); one or more input devices 506; and one or more output devices 508. The input devices 506 can include a mouse, a keyboard, or other input device. The output devices 508 can include a display device, a printer, or other output device.

The computational system 500 may further include (and/or be in communication with) one or more storage devices 510. The storage devices 510 may include local and/or network-accessible storage, a disk drive, a drive array, an optical storage device, a solid-state storage device, random access memory ("RAM"), and/or read-only memory ("ROM"), which can be programmable, flash-updateable, and/or the like. The computational system 500 may also include a communication subsystem 512, which may include a modem, a network card (wireless or wired), an infrared communication device, a wireless communication device, and/or a chipset (such as a Bluetooth® device, a 802.6 device, a WiFi device, a WiMAX device, cellular communication facilities, etc.), and/or the like. The communication subsystem 530 may permit data to be exchanged with a network, such as the network 106 of FIG. 1 and/or any other system or device described herein. In some embodiments, the computational system 500 may further include a working memory 514, which may include a RAM or ROM device or other memory.

The computational system 500 also can include software elements or programs, depicted in FIG. 5 as being currently located within the working memory 514. Such software elements may include an operating system 516 and/or other code, such as one or more application programs 518. The application programs 518 may include computer programs executable, e.g. by the processor 504, to perform or control performance of the method 400 of FIG. 4 or other methods or operations described herein. For example, one or more procedures described with respect to the method(s) discussed herein might be implemented as code and/or instructions executable by a computer (and/or a processor within a computer). A set of these instructions and/or codes might be stored on a computer-readable storage medium, such as the storage device(s) 510 of FIG. 5.

In some cases, the storage medium may be incorporated within the computational system 500 or in communication with the computational system 500. In other embodiments, the storage medium may be separate from the computational system 500 (e.g., a removable medium, such as a compact disc, etc.), and/or provided in an installation package, such that the storage medium can be used to program a general-purpose computer with the instructions/code stored thereon. These instructions might take the form of executable code, which is executable by the computational system 500 and/or might take the form of source and/or installable code, which, upon compilation and/or installation on the computational system 500 (e.g., using any of a variety of generally available compilers, installation programs, compression/decompression utilities, etc.), then takes the form of executable code.

EXPERIMENTAL RESULTS

Experiments were performed using data from two different radar systems to illustrate and prove the concept of the disclosed method, various results of which are presented herein. The first data set consists of 24 hours of data (e.g., 1047 images with dimensions 355×1597) from 3 different waveforms collected by the Vaisala dual-polarization C-band SSPA prototype at Kumpula, Helsinki, Finland, on Mar. 10, 2019. The 3 different waveforms include a 4.5 microsecond (s) continuous wave (CW) waveform, a linear frequency modulated (LFM) hybrid waveform, and a non LFM (NLFM) hybrid waveform.

As mentioned elsewhere, this first data set is referred to as the Kumpula data set. The Kumpula data set includes 10 different Level 2 data products: radar echo classification, differential phase, correlation coefficient ($\rho_{hv}$), normalized coherent power/signal quality index, spectrum width, total power, reflectivity, differential reflectivity, specific differential phase, and mean radial velocity. Two distinct weather events were observed within the Kumpula data set with substantial RFI coincident with precipitation.

Experiment 1

Table 1 provides details of various parameters and values used by an embodiment of the disclosed invention for a first experiment using the Kumpula data set.

TABLE 1

| Parameter | Value |
| --- | --- |
| Mask data | Normalized Coherent Power |
| Mask threshold | 0.1 |
| Despeckle filter size (square side of length) | 12 |
| $\ell_0$ norm profile convolution threshold | 100000 |
| RFI filter width (degrees) | 3 |
| Data imputation width (degrees) | 3 |
| Data imputation method | Linear |

One of the objectives of the first experiment was to determine how standard "off-the-shelf" image processing techniques affect desired precipitation data. Any technique to mitigate RFI should preserve desired precipitation data, in the presence or absence of RFI, to be effective. As illustrated in, e.g., FIGS. 6-9, embodiments described herein are more effective than standard image processing techniques with respect to preserving desired precipitation data in the presence or absence of RFI and with respect to identifying, and optionally removing, RFI.

Figure 6:
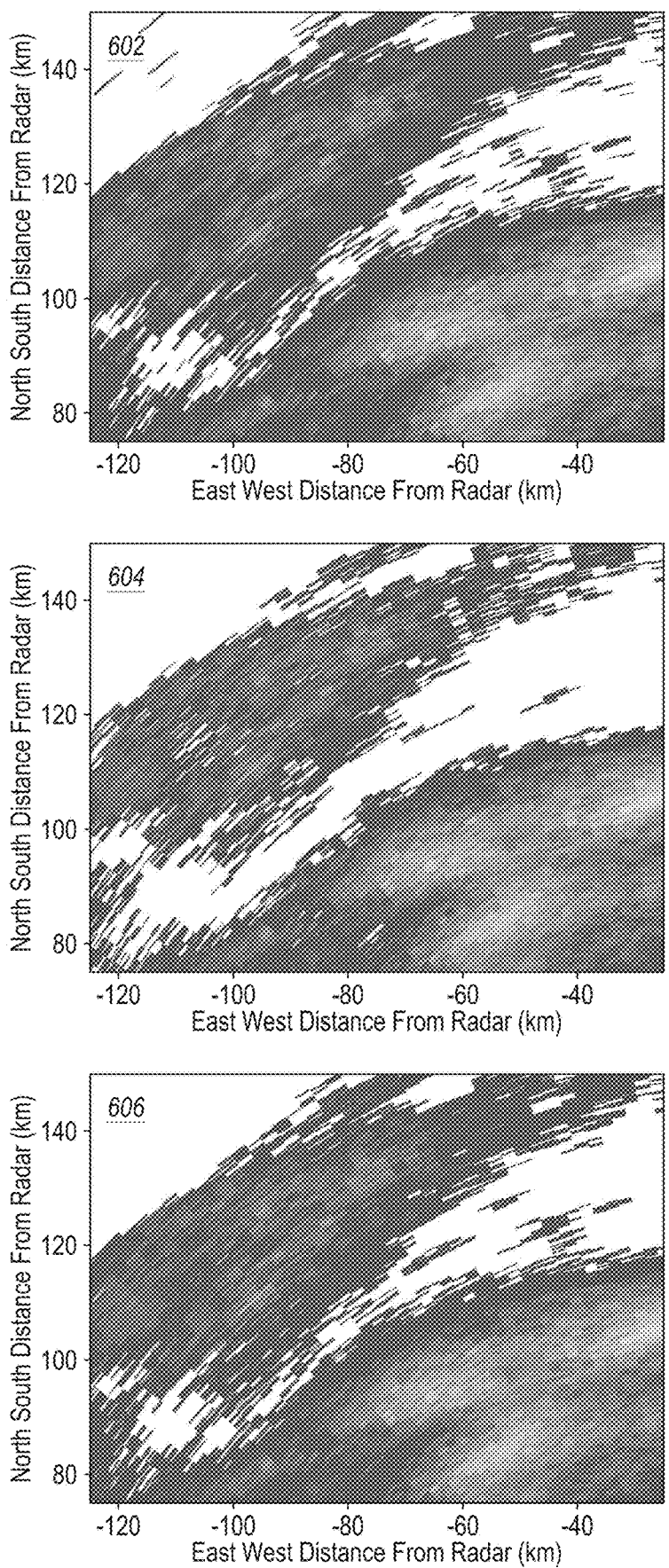
FIG. 6 includes various weather radar data images that provide a first comparison of performance of the method of FIG. 4 to a standard image processing technique.

In more detail, FIG. 6 includes various weather radar data images 602, 604, 606 that provide a first comparison of performance of the method 400 of FIG. 4 to a standard image processing technique, arranged in accordance with at least one embodiment described herein. The standard image processing technique generally includes filtering the reflectivity data using a normalized coherent power mask threshold of 0.25, and despeckling with side length 12.

The image 602 was generated from unfiltered reflectivity data of the Kumpula data set and lacks RFI. The image 604 was generated by application of the standard image processing technique to the unfiltered reflectivity data. The image 606 was generated by application of the method 400 to the unfiltered reflectivity data.

It can be seen from a comparison of each of the images 604 and 606 to the image 602 and to each other that the standard image processing technique (image 604) removes significant precipitation data from the image 602, while the embodiment of the method 400 (image 606) generally does not.

Figure 7:
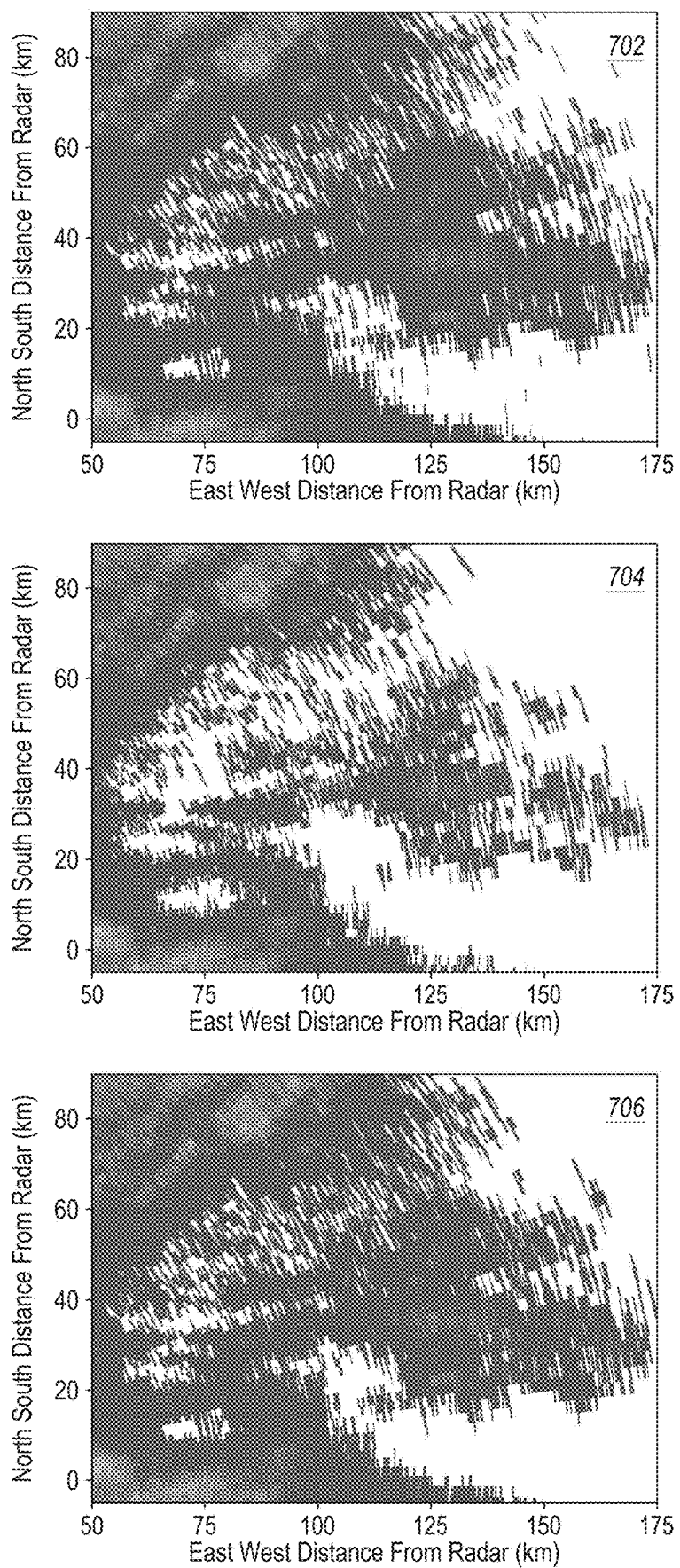
FIG. 7 includes various weather radar data images that provide a second comparison of performance of the method of FIG. 4 to the standard image processing technique.

FIG. 7 includes various weather radar data images 702, 704, 706 that provide a second comparison of performance of the method 400 of FIG. 4 to the standard image processing technique, arranged in accordance with at least one embodiment described herein. The image 702 was generated from unfiltered reflectivity data of the Kumpula data set and lacks RFI. The image 704 was generated by application of the standard image processing technique to the unfiltered reflectivity data. The image 706 was generated by application of the method 400 to the unfiltered reflectivity data.

It can be seen from a comparison of each of the images 704 and 706 to the image 702 and to each other that the standard image processing technique (image 704) removes significant precipitation data from the image 702, while the embodiment of the method 400 (image 706) generally does not.

Figure 8:
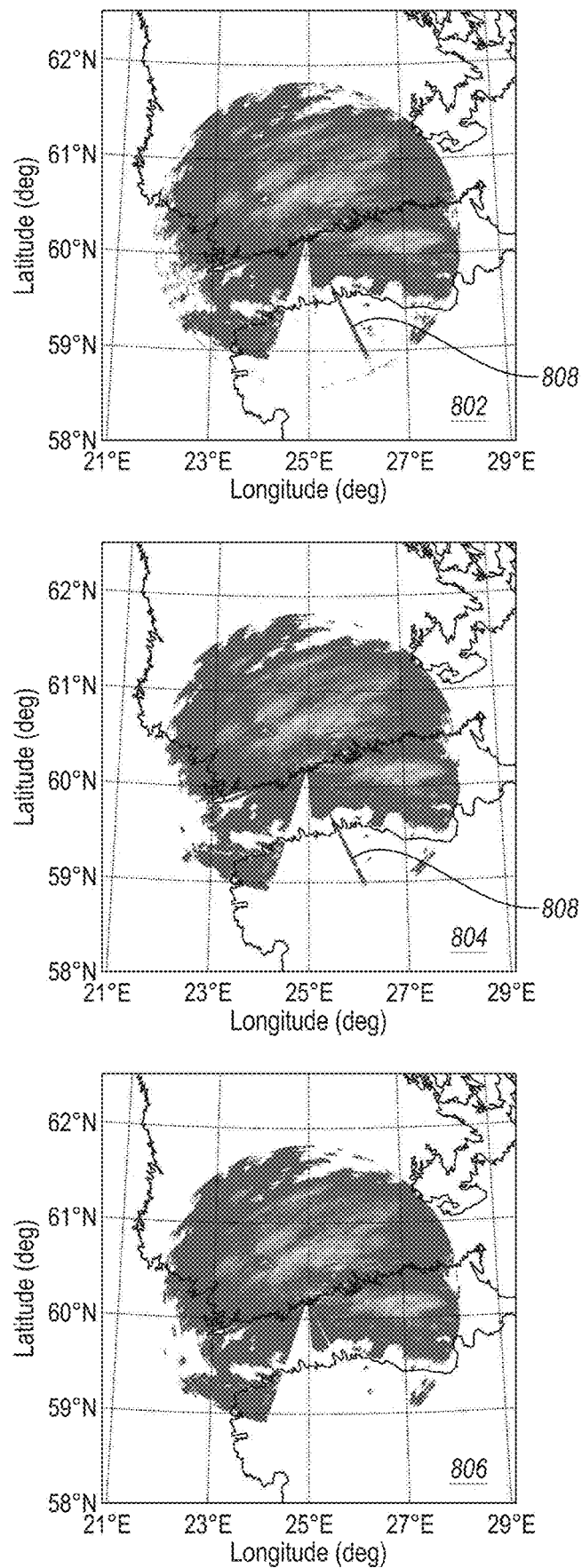
FIG. 8 includes various weather radar data images that provide a third comparison of performance of the method of FIG. 4 to the standard image processing technique.

FIG. 8 includes various weather radar data images 802, 804, 806 that provide a third comparison of performance of the method 400 of FIG. 4 to the standard image processing technique, arranged in accordance with at least one embodiment described herein. The image 802 was generated from unfiltered reflectivity data of the Kumpula data set and includes isolated RFI, e.g., an RFI radial 808 at about 150 degrees (about 5 o'clock). The image 804 was generated by application of the standard image processing technique to the unfiltered reflectivity data. The image 806 was generated by application of the method 400 to the unfiltered reflectivity data.

It can be seen from FIG. 8 that the method 400 (image 806) successfully identifies and eliminates the RFI radial 808, while the standard image processing technique (image 804) does not. Further, it can be seen from a comparison of each of the images 804 and 806 to the image 802 and to each other that the standard image processing technique (image 804) removes more precipitation data from the image 802 than the method 400 (image 806).

FIGS. 6-8 generally show that the method 400 is superior to the standard image processing technique at least in the senses of preserving desired precipitation data and removing isolated RFI. Identifying and removing RFI that is coincident with precipitation is more challenging than identifying and removing isolated RFI, but the method 400 is able to do so. Even so, FIG. 2 shows an example of the performance of the method 400 of FIG. 4 when the weather radar data includes both isolated RFI and RFI coincident with precipitation in the same image. In FIG. 2, the image 202 was generated from unfiltered reflectivity data of the Kumpula data set and includes isolated RFI, e.g., the RFI radial 206, as well as RFI that is coincident with precipitation, e.g., the RFI radials 208, 210. As described above, the image 212 was generated by application of a method similar or identical to the method 400 to the unfiltered reflectivity data. It can be seen from the image 212 of FIG. 2 that the method 400 successfully identifies and eliminates the RFI radials 206, 208, 210 visible in the image 202 while substantially preserving the precipitation data.

In the example of FIG. 2, the RFI, e.g., RFI radials 206, 208, 210, is determined/identified and removed, while also imputing replacement data for the data of the RFI radials 206, 208, 210 that was removed. Alternatively or additionally, the RFI may be identified to an end user, e.g., by being displayed by itself separate from the precipitation data to the end user.

Figure 9:
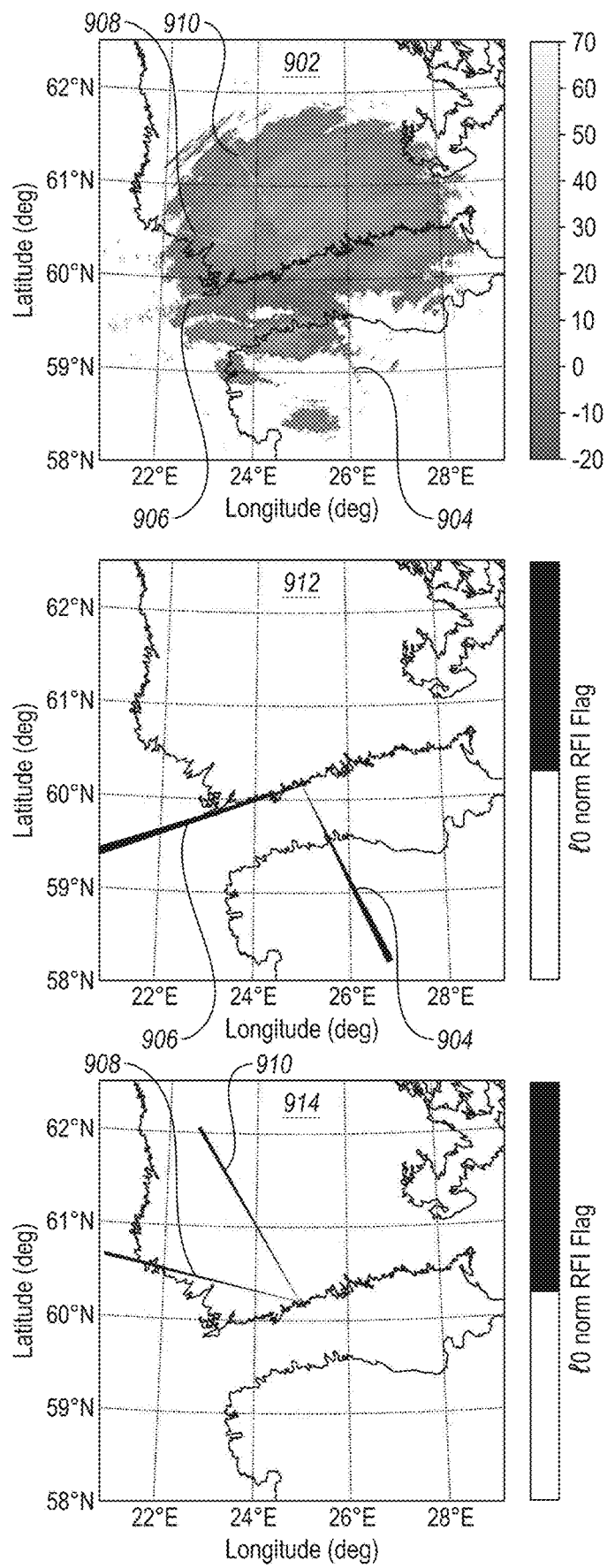
FIG. 9 includes a weather radar data image with RFI, including both isolated RFI and RFI coincident with precipitation.

FIG. 9 includes a weather radar data image 902 with RFI, including both isolated RFI and RFI coincident with precipitation. The image 902 was generated from unfiltered reflectivity data of the Kumpula data set. The RFI of the image 902 includes an RFI radial 904 that is generally isolated from precipitation and RFI radials 906, 908, 910 that are coincident with precipitation. At least some of the method 400 may be applied to the unfiltered reflectivity data used to generate the image 902 to identify the RFI radials 904, 906, 908, 910. One or more images may then be generated and displayed, e.g., by the computer device 104 or computational system 500, that include one or more of the RFI radials 904, 906, 908, 910 without the precipitation, e.g., by generating the images using only the data points of the RFI radials 904, 906, 908, 910. In the example of FIG. 9, two images 912, 914 were generated where each includes some of the RFI radials 904, 906, 908, 910. In particular, the image 912 includes the RFI radials 904, 906 and the image 914 includes the RFI radials 908, 910. In this example, the RFI radials 904, 906 are weaker than the RFI radials 908, 910 which was used as the criteria to determine which RFI radials 904, 906, 908, 910 to display in the images 912, 914.

The examples of FIGS. 2 and 6-9 apply the method 400 specifically to reflectivity data as the weather radar data. The method 400 may be applied to other Level 2 or higher data products, two examples of which are described with respect to FIG. 10.

Figure 10:
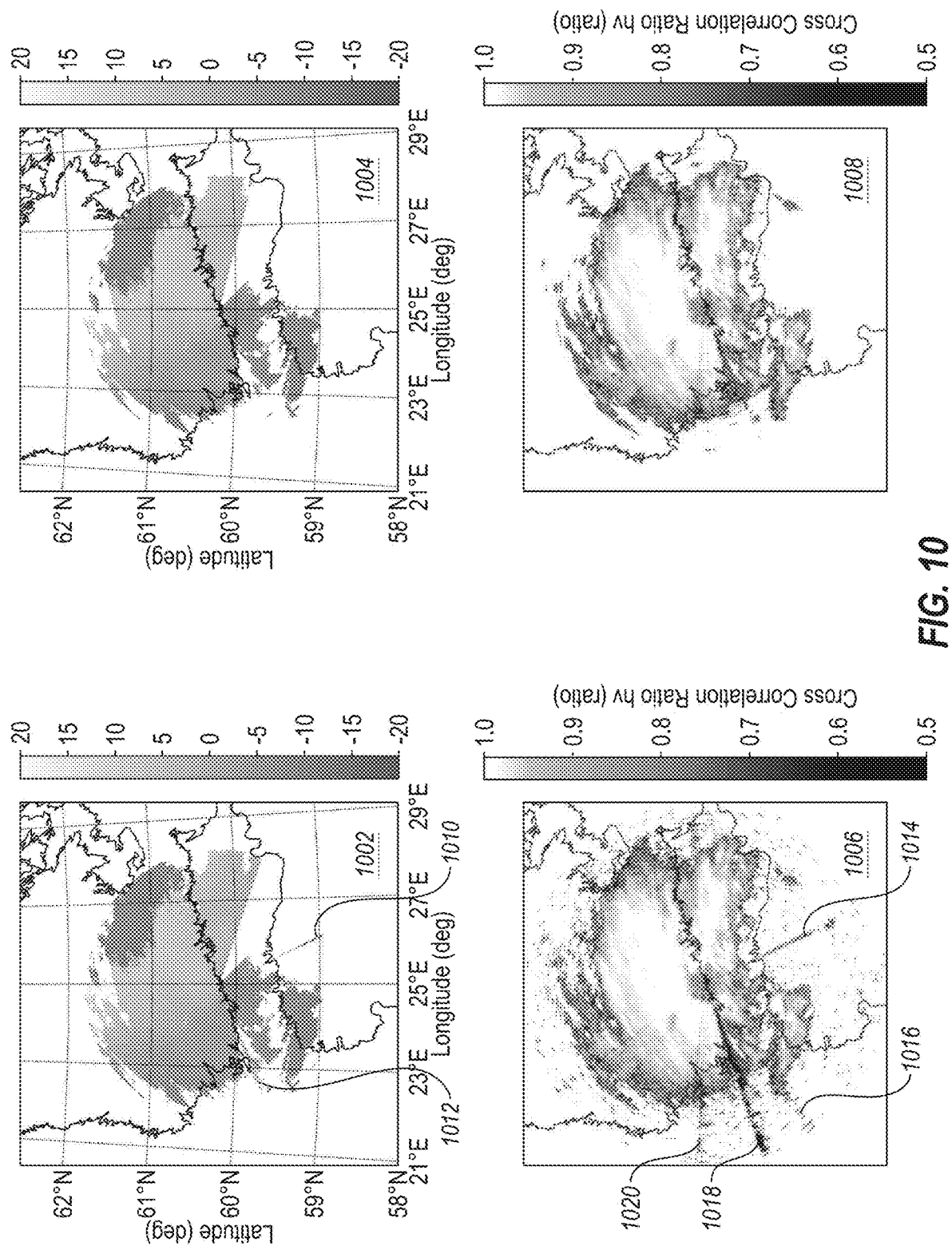
FIG. 10 includes various weather radar data images that show example performance of the method of FIG. 4 when applied to mean radial velocity data and correlation coefficient ($\rho_{hv}$) data.

FIG. 10 includes various weather radar data images 1002, 1004, 1006, 1008 that show example performance of the method 400 when applied to mean radial velocity data and correlation coefficient ($\rho_{hv}$) data, arranged in accordance with at least one embodiment described herein.

The image 1002 was generated from unfiltered mean radial velocity data of the Kumpula data set and includes RFI, specifically RFI radials 1010, 1012. The image 1004 was generated by application of the method 400 to the unfiltered mean radial velocity data. It can be seen from the image 1004 of FIG. 10 that the method 400 successfully identifies and eliminates the RFI radials 1010, 1012 visible in the image 1002 while substantially preserving the precipitation data.

The image 1006 was generated from unfiltered correlation coefficient ($\rho_{hv}$) data of the Kumpula data set and includes RFI, specifically RFI radials 1014, 1016, 1018, 1020. The image 1008 was generated by application of the method 400 to the unfiltered correlation coefficient ($\rho_{hv}$) data. It can be seen from the image 1008 of FIG. 10 that the method 400 successfully identifies and eliminates the RFI radials 1014, 1016, 1018, 1020 visible in the image 1006 while substantially preserving the precipitation data.

The only parameter change when applying the method 400 to the unfiltered mean radial velocity data or the unfiltered correlation coefficient ($\rho_{hv}$) data versus the unfiltered reflectivity data was the $\ell_0$ norm profile convolution threshold to correspond with the values of the different data. This shows that the method 400 is relatively insensitive to parameter selection when considering RFI mitigation in different data products from the same radar system. The results of FIG. 10 also show that the method 400 works effectively on phase-based data (e.g., mean radial velocity) and dual-polarization data (e.g., correlation coefficient ($\rho_{hv}$)). The example of FIG. 10 utilizes the most challenging RFI scenario from the Kumpula data set as being representative. The results utilizing other data from the Kumpula data set were similar.

In the first experiment, RFI mitigation according to the method 400 was quantified using the mean radial velocity data for each of the three waveforms used (e.g., 4.5 μs CW, LFM hybrid, and NLFM hybrid) since the reflectivity data was too contaminated and thus too ambiguous to quantify. Images of unfiltered mean radial velocity data containing RFI visible to the naked eye were manually identified and counted. The method 400 was then applied to the unfiltered mean radial velocity data of the images identified in the previous step, e.g., those with RFI, to generate filtered images. The filtered images were then reviewed manually again to count those filtered images still containing visible RFI and those that no longer contain visible RFI. The results are shown in Table 2.

TABLE 2

| Waveform | Number of images with RFI presence before filtering | Number of images with RFI presence after filtering | Percent reduction in RFI due to filtering |
| --- | --- | --- | --- |
| 4.5 μs CW | 73 | 2 | 97 |
| LFM hybrid | 119 | 8 | 93 |
| NLFM hybrid | 94 | 11 | 88 |

Computational complexity is one characteristic of an RFI filter. An algorithm to mitigate or filter RFI in real time, such as the method 400, must run quickly to be operationally serviceable. Table 3 includes average runtimes for each of a thresholding and despeckling step, an RFI identification step, an RFI removal step, and a data imputation step such as may be implemented in the method 400 as applied to the Kumpula data set. Table 3 also includes a total runtime, e.g., a sum of the foregoing steps.

TABLE 3

| Operation | Average Runtime (seconds) |
| --- | --- |
| Thresholding and despeckling | 0.19 |
| RFI identification | 0.24 |
| RFI removal | 0.01 |
| Data imputation | 2.84 |
| Total | 3.28 |

As set forth in Table 3, the method 400 is quite fast, well within the typical time for a radar system (even a phased array radar) to collect data during a full 360-degree azimuthal sweep.

Experiment 2

The second experiment used a different data set than the Kumpula data set. In particular, the second experiment used Next-Generation Radar (NEXRAD) reflectivity data collected by the KMHX NEXRAD radar system at Morehead City, N.C. during a scan at 1845 UTC on 25 Jun. 2011. The data used in the second experiment is similar to that analyzed and shown in the Cho paper in 2017.

The Cho paper presents three different RFI mitigation techniques: (1) the "Vaisala-3" algorithm, (2) a 1D median filter, and (3) a 2D median filter. The Cho paper is considered to present the current state-of-the-art of RFI mitigation techniques for weather radar data.

The data set used in the second experiment consists of two images, one Level 2 reflectivity image (with dimensions 720×1832) and one Level 3 reflectivity image (with dimensions 360×460), collected by the KMHX NEXRAD radar system with the radar system at the lowest elevation angle and low-pulse repetition frequency (PRF) mode during a volume coverage pattern (VCP) 21 scan at 1845 UTC on 25 Jun. 2011. Level 3 data is analyzed here because these data are often used by National Weather Service forecasters in the United States. These images present another challenging scenario where strong RFI is coincident with strong precipitation, where both are similarly valued. The second experiment shows the performance of the method 400 using data collected by a radar operating at S-band using a klystron transmitter.

An objective of the second experiment was to determine how the method 400 compares in terms of RFI mitigation to what can be considered as the current state-of-the-art RFI mitigation technique on nearly common data.

FIG. 11 includes various weather radar data images 1102, 1104, 1106, 1108 that provide a comparison of performance of the three techniques described in the Cho paper, all operating on Level 1 data. The image 1102 was generated from unfiltered Level 1 reflectivity data generated by the KMHX NEXRAD radar system with the radar system at the lowest elevation angle and PRF mode during a VCP 21 scan at 1845 UTC on 25 Jun. 2011.

As illustrated, the reflectivity data includes RFI, e.g., an RFI radial 1110, at about 240 degrees (about 8 o'clock). The RFI radial 1110 is coincident with strong precipitation out to about 100 kilometers (km) from a location of the KMHX NEXRAD radar system.

The image 1104 was generated by application of the Vaisala-3 algorithm. The image 1106 was generated by application of the 1D median filter. The image 1108 was generated by application of the 2D median filter. The images 1104, 1106, 1108 are presented in the order in which the corresponding RFI filtering techniques performed, from least to most effective.

FIG. 12 includes detail images 1202, 1204 of portions of the images 1104 and 1108 of FIG. 11 near the strong precipitation. In particular, the detail image 1202 includes a zoomed in view of the image 1104 near the strong precipitation and the detail image 1204 includes a zoomed in view of the image 1108 near the strong precipitation.

It can be seen from FIG. 11 that the Vaisala-3 algorithm and the 1D median filter each leaves residual RFI in areas where the RFI is isolated from precipitation. It can be seen from FIGS. 11 and 12 that none of the RFI filtering techniques filters the RFI that is coincident with precipitation.

The 2D median filter disclosed by Cho appears to effectively mitigate isolated RFI in the experiment Cho performed. However, the 2D median filter is not operationally viable. According to Cho, "However, as the 2D RFI filter already has an increased computational burden compared to the conventional 1D algorithms, a more efficient solution is desired for real-time implementation."

FIG. 13 includes weather radar data images 1302, 1304 that show example performance of the method 400 when applied to reflectivity data that closely resembles but does not exactly match the Level 1 data used by Cho, arranged in accordance with at least one embodiment described herein. Since Cho's method works on Level 1 data, the reflectivity images shown in the Cho paper were generated by Cho from the Level 1 data whereas the data used in this experiment were acquired from the National Weather Service (NWS) Level 2 NEXRAD Amazon Web Services archive. The processing done by Cho and the NWS on the Level 1 data to generate their respective Level 2 data is likely slightly different.

The image 1302 was generated from unfiltered Level 2 reflectivity data from the NWS and includes RFI, specifically an RFI radial 1306 at about 240 degrees (about 8 o'clock). The image 1302 has the same or similar aspect and graphically represents similar reflectivity data as the image 1102 of FIG. 11. The image 1304 was generated by application of the method 400 to the unfiltered Level 2 reflectivity data. It can be seen from the image 1304 that the method 400 successfully identifies and eliminates the RFI radial 1306 both where the RFI radial 1306 is coincident with precipitation and where the RFI radial 1306 is isolated from precipitation.

FIG. 14 includes detail images 1402, 1404, 1406, 1408 of portions of the images 1302, 1304 of FIG. 13 that include the precipitation, arranged in accordance with at least one embodiment described herein.

The detail image 1402 includes a zoomed in view of the image 1302 generated from the unfiltered Level 2 reflectivity data and shows the RFI radial 1306 where it is coincident with precipitation.

The detail images 1404, 1406, 1408 each includes a zoomed in view of the image 1304 generated by application of the method 400 to the unfiltered Level 2 reflectivity data with a different level of data imputation. In the detail image 1404, the method 400 applied data imputation to generate replacement data for all data of the RFI radial 1306 that was removed. In the detail image 1406, the method 400 applied data imputation to generate replacement data for some, but not all, data of the RFI radial 1306 that was removed. In the detail image 1408, the method 400 did not apply any data imputation and instead removed all data of the RFI radial 1306 without replacing any of the removed data with imputed replacement data. Thus, as illustrated in FIG. 14 and as described above, the method 400 may impute replacement data for all, some, or none of the data of each RFI radial that is removed.

FIG. 15 includes weather radar data images 1502, 1504 that show example performance of the method 400 when applied to Level 3 reflectivity data from the same radar system and time as the Level 2 reflectivity data used in FIGS. 13-14, arranged in accordance with at least one embodiment described herein. The image 1502 was generated from unfiltered Level 3 reflectivity data from the NWS and includes RFI, specifically an RFI radial 1506 at about 240 degrees (about 8 o'clock). The image 1502 has the same or similar aspect and graphically represents the same or similar reflectivity data as the image 1102 of FIG. 11 or the image 1302 of FIG. 13. The image 1504 was generated by application of the method 400 to the unfiltered Level 3 reflectivity data. It can be seen from FIG. 15 that the method 400 is effective at filtering RFI from both the isolated and overlaid areas of Level 3 data, similar to the results using Level 2 data.

The second experiment using the NEXRAD data demonstrates the effective applicability of the method 400 to a different radar and different data than used in the first experiment. RFI mitigation effectiveness of the method 400 was directly compared to what can be considered the current state-of-the-art method (See FIGS. 11-12 and associated description) and illustrates some of the data imputation options (see FIG. 14 and associated description) afforded by the method 400. Note that the data imputation shown in FIG. 14 is a simple first-order (linear) method. More elaborate, higher-order mathematical methods such as polynomial, cubic spline, Piecewise Cubic Hermite Interpolator (PCHIP), or computer vision-based methods such as exemplar-, hybrid diffusion and exemplar-, or deep learning-based inpainting can be used in the data imputation of the method 400, which may give better results.

Table 4 includes average runtimes for each of a thresholding and despeckling step, an RFI identification step, an RFI removal step, and a data imputation step such as may be implemented in the method 400 as applied to the NEXRAD Level 2 data and the NEXRAD Level 3 data. Table 4 also includes a total runtime, e.g., a sum of the foregoing steps.

TABLE 4

| | Average Runtime (seconds) | |
|---|---|---|
| Operation | NEXRAD Level 2 data | NEXRAD Level 3 data |
| Thresholding and despeckling | 0.54 | 0.03 |
| RFI identification | 0.52 | 0.18 |
| RFI removal | 0.01 | 0.01 |
| Data imputation | 3.48 | 1.00 |
| Total | 4.55 | 1.22 |

As Table 4 shows, the disclosed invention is quite fast, well within the typical time for a radar (even a phased array radar) to collect data during a full 360-degree azimuthal sweep. In some embodiments, the method 400 may be performed on data of a full 360-degree azimuthal sweep in less time than it takes to complete a subsequent full 360-degree azimuthal sweep.

The second experiment demonstrates that the method 400 is relatively insensitive to parameter tuning, as the only changes from the Kumpula dataset (e.g., Vaisala SSPA C-band data) to the NEXRAD Level 2 data were changing the size of the despeckling filter from 12 to 5 and the RFI filter width from 3 to 5 degrees. The only additional change to the parameters when moving from NEXRAD Level 2 to Level 3 data was changing the to norm threshold from 100,000 to 85,000.

The second experiment also shows how the method 400 performs in a scenario where returns from RFI coincident with precipitation are similarly valued to those returns from surrounding precipitation. The RFI filtering techniques presented by Cho leave RFI overlaid with precipitation data (see FIG. 12) while the method 400 removes both RFI and precipitation data. The method 400 may then impute data at various levels (e.g., none, some, or all), while introducing some artifacts directly proportional to the azimuthal extent of the RFI removed.

Some embodiments described herein, including the experiments, show several differences and benefits over other RFI filtering techniques. These may include:

1. Effectiveness. Based on the Level 2 data consensus and the convolution kernel based on observed natural differences between RFI and precipitation, the method 400 was shown to perform well when identifying and removing RFI while preserving precipitation data when both are coincident or isolated. It was shown that the method 400 effectively mitigated RFI from C-band (SSPA) single- and dual-polarization data and S-band (klystron) single-polarization data, where these two radar systems operated with different scan strategies and waveforms.

2. Efficiency. The method 400 may process full-resolution and full-coverage weather radar data in only a few seconds, fast enough for real-time operation using short dwell times.

3. Flexibility. Users of the method 400 may have the option to remove identified RFI along with precipitation and impute the removed precipitation data to various levels, including no imputation. The method 400 may also output only the identified RFI and leave the radar data unchanged. The method 400 may thus be implemented as both an RFI identifier and an RFI filter.

Unless specific arrangements described herein are mutually exclusive with one another, the various implementations described herein can be combined in whole or in part to enhance system functionality or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method to mitigate radio frequency interference (RFI) in weather radar data, comprising:
using a radar antenna to generate weather radar data;
computing $\ell_p$ norms of radials of the weather radar data to construct an $\ell_p$ norm profile of the weather radar data as a function of azimuth angle, the weather radar data comprising Level 2 or higher weather radar data in polar format, wherein each $\ell_p$ norm comprises an $\ell_0$ norm, a Manhattan Distance, or a Euclidian Norm;
determining that a given radial in the weather radar data is an RFI radial based on the $\ell_p$ norm profile of the weather radar data; and
displaying an image from the weather radar data in which at least one of:
the RFI radial is identified in the image as including RFI; or
the RFI radial is omitted from the image.

2. The method of claim 1, further comprising deleting data points of the RFI radial from the weather radar data before displaying the image to cause the RFI radial to be omitted from the image when the image is displayed.

3. The method of claim 2, further comprising imputing at least some replacement data points for the deleted data points from data points of two or more non-RFI radials in the weather radar data that are near a location of the RFI radial.

4. The method of claim 3, wherein imputing at least some replacement data points for the deleted data points from data points of two or more non-RFI radials in the weather radar data that are near the location of the RFI radial comprises interpolating from each side of the RFI radial.

5. The method of claim 1, further comprising, prior to computing the $\ell_p$ norms, applying a threshold to the weather radar data to suppress noise and precipitation data.

6. The method of claim 5, wherein applying the threshold to the weather radar data comprises temporarily disregarding each data point that has a magnitude below the threshold for computation of the $\ell_p$ norms.

7. The method of claim 1, further comprising determining that the given radial includes the RFI radial based on a consensus of first and second data products included in the weather radar data.

8. The method of claim 7, wherein:
computing the $\ell_p$ norms of the radials of the weather radar data to construct the $\ell_p$ norm profile comprises computing first $\ell_p$ norms of radials of the first data product to construct a first $\ell_p$ norm profile;
the method further comprises:
computing second $\ell_p$ norms of radials of the second data product to construct a second $\ell_p$ norm profile; and
averaging the first $\ell_p$ norm profile and the second $\ell_p$ norm profile to form an average $\ell_p$ norm profile; and
determining that the given radial is the RFI radial based on the consensus of the first and second data products comprises determining that the given radial is the RFI radial based on the average $\ell_p$ norm profile.

9. The method of claim 1, wherein determining that the given radial in the weather radar data is the RFI radial based on the $\ell_p$ norm profile of the weather radar data includes determining that a convolution of a derivative of the $\ell_p$ norm profile with a RFI kernel exceeds a threshold at an azimuth angle of the given radial.

10. The method of claim 9, further comprising, prior to determining that the convolution exceeds the threshold:
  computing the derivative of the $\ell_p$ norm profile with respect to azimuth angle;
  obtaining the RFI kernel; and
  computing the convolution;
  wherein obtaining the RFI kernel comprises one of:
    computing a template RFI kernel to use as the RFI kernel, the template RFI kernel including an approximation of typical radials in an azimuthal neighborhood of RFI;
    deriving a wavelet RFI kernel to use as the RFI kernel, the wavelet RFI kernel derived from data that represents an actual RFI radial and neighboring radials; or
    deriving an average wavelet RFI kernel to use as the RFI kernel, the average wavelet RFI kernel derived from data that represents multiple actual RFI radials and respective neighboring radials.

11. The method of claim 1, further comprising, prior to displaying the image of the weather radar data, despeckling and masking the weather radar data to remove noise, wherein displaying the image of the weather radar data comprises displaying the image of the despeckled and masked weather radar data.

12. A non-transitory computer-readable medium having computer-readable instructions stored thereon that are executable by a processor to perform or control performance of operations comprising:
  using a radar antenna to generate weather radar data;
  computing $\ell_p$ norms of radials of the weather radar data to construct an $\ell_p$ norm profile of the weather radar data as a function of azimuth angle, the weather radar data comprising Level 2 or higher weather radar data in polar format, wherein each $\ell_p$ norm comprises an $\ell_0$ norm, a Manhattan Distance, or a Euclidian Norm;
  determining that a given radial in the weather radar data is a radio frequency interference (RFI) radial based on the $\ell_p$ norm profile of the weather radar data; and
  displaying an image from the weather radar data in which at least one of:
    the RFI radial is identified in the image as including RFI; or
    the RFI radial is omitted from the image.

13. The non-transitory computer-readable medium of claim 12, the operations further comprising deleting data points of the RFI radial from the weather radar data before displaying the image to cause the RFI radial to be omitted from the image when the image is displayed.

14. The non-transitory computer-readable medium of claim 13, the operations further comprising imputing at least some replacement data points for the deleted data points from data points of two or more non-RFI radials in the weather radar data that are near a location of the RFI radial.

15. The non-transitory computer-readable medium of claim 12, the operations further comprising, prior to computing the $\ell_p$ norms, applying a threshold to the weather radar data to suppress noise and precipitation data.

16. The non-transitory computer-readable medium of claim 12, the operations further comprising determining that the given radial is the RFI radial based on a consensus of first and second data products included in the weather radar data.

17. The non-transitory computer-readable medium of claim 16, wherein:
  computing the $\ell_p$ norms of the radials of the weather radar data to construct the $\ell_p$ norm profile comprises computing first $\ell_p$ norms of radials of the first data product to construct a first $\ell_p$ norm profile;
  the operations further comprise:
    computing second $\ell_p$ norms of radials of the second data product to construct a second $\ell_p$ norm profile; and
    averaging the first $\ell_p$ norm profile and the second $\ell_p$ norm profile to form an average $\ell_p$ norm profile; and
  determining that the given radial is the RFI radial based on the consensus of the first and second data products comprises determining that the given radial is the RFI radial based on the average $\ell_p$ norm profile.

18. The non-transitory computer-readable medium of claim 12, wherein determining that the given radial in the weather radar data includes the RFI radial based on the $\ell_p$ norm profile of the weather radar data includes determining that a convolution of a derivative of the $\ell_p$ norm profile with a RFI kernel exceeds a threshold at an azimuth angle of the given radial.

19. The non-transitory computer-readable medium of claim 18, the operations further comprising, prior to determining that the convolution exceeds the threshold:
  computing the derivative of the $\ell_p$ norm profile with respect to azimuth angle;
  obtaining the RFI kernel; and
  computing the convolution;
  wherein obtaining the RFI kernel comprises one of:
    computing a template RFI kernel to use as the RFI kernel, the template RFI kernel including an approximation of typical radials in an azimuthal neighborhood of RFI;
    deriving a wavelet RFI kernel to use as the RFI kernel, the wavelet RFI kernel derived from data that represents an actual RFI radial and neighboring radials; or
    deriving an average wavelet RFI kernel to use as the RFI kernel, the average wavelet RFI kernel derived from data that represents multiple actual RFI radials and respective neighboring radials.

20. A method, comprising:
  using a radar antenna to generate weather radar data;
  computing $\ell_p$ norms of radials of the weather radar data to construct an $\ell_p$ norm profile of the weather radar data as a function of azimuth angle, the weather radar data comprising Level 2 or higher weather radar data in polar format, wherein:
    each $\ell_p$ norm comprises an $\ell_p$ norm, a Manhattan Distance, or a Euclidian Norm;
    the weather radar data in polar format includes, for each data point, a magnitude of the corresponding data point and a location of the corresponding data point, the location specified by a radial distance and azimuth angle; and
    each radial includes all data points that have an azimuth angle within a given range of azimuth angles across a radial distance range for each azimuth angle within the given range of azimuth angles;
  computing a derivative of the $\ell_p$ norm profile with respect to azimuth angle;
  obtaining a radio frequency interference (RFI) kernel, wherein obtaining the RFI kernel comprises one of:
    computing a template RFI kernel to use as the RFI kernel, the template RFI kernel including an approximation of typical radials in an azimuthal neighborhood of RFI;

deriving a wavelet RFI kernel to use as the RFI kernel, the wavelet RFI kernel derived from data that represents an actual RFI radial and neighboring radials; or deriving an average wavelet RFI kernel to use as the RFI kernel, the average wavelet RFI kernel derived from data that represents multiple actual RFI radials and respective neighboring radials;

computing a convolution of the derivative of the $\ell_p$ norm profile with the RFI kernel;

determining that a given radial in the weather radar data includes an RFI radial based on the $\ell_p$ norm profile of the weather radar data, including determining that the convolution exceeds a threshold at an azimuth angle of the given radial; and displaying an image from the weather radar data in which at least one of:

the RFI radial is identified in the image as including RFI; or the RFI radial is omitted from the image.

* * * * *